US011915683B2

(12) United States Patent
Gabrys et al.

(10) Patent No.: US 11,915,683 B2
(45) Date of Patent: Feb. 27, 2024

(54) VOICE ADAPTATION USING SYNTHETIC SPEECH PROCESSING

(71) Applicant: Amazon Technologies, Inc., Seattle, WA (US)

(72) Inventors: Adam Marek Gabrys, Sopot (PL); Jaime Lorenzo Trueba, Madrid (ES); Goeric Sydney Huybrechts, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/671,006

(22) Filed: Feb. 14, 2022

(65) Prior Publication Data
US 2023/0260502 A1    Aug. 17, 2023

(51) Int. Cl.
| | | |
|---|---|---|
| *G10L 19/16* | (2013.01) | |
| *G10L 13/08* | (2013.01) | |
| *G10L 13/047* | (2013.01) | |
| *G06N 3/045* | (2023.01) | |
| *G10L 13/027* | (2013.01) | |

(52) U.S. Cl.
CPC ............ *G10L 13/047* (2013.01); *G06N 3/045* (2023.01); *G10L 13/027* (2013.01); *G10L 13/08* (2013.01); *G10L 19/16* (2013.01)

(58) Field of Classification Search
CPC ......... G10L 13/02; G10L 13/08; G10L 25/24; G10L 25/30
See application file for complete search history.

(56) References Cited

U.S. PATENT DOCUMENTS 11,410,684 B1 *   8/2022   Klimkov ................. G10L 25/78

FOREIGN PATENT DOCUMENTS

CN         115206281 A   * 10/2022

OTHER PUBLICATIONS

International Search Report and Written Opinion issued for International Patent Application No. PCT/ US2023/012762, dated Jun. 1, 2023, 15 pages.

(Continued)

*Primary Examiner* — Shreyans A Patel
(74) *Attorney, Agent, or Firm* — Pierce Atwood LLP

(57) ABSTRACT

A text-to-speech (TTS) system may be configured to imitate characteristics of a target voice based on a limited dataset. The TTS system may include a machine learning model pre-trained using a synthetic parallel dataset and fine-tuned using examples of the target voice. A TTS component trained using a large single-speaker dataset may be used to generate the synthetic parallel dataset based on a multi-speaker dataset. The synthetic parallel dataset may include target audio data representing speech in the multi-speaker dataset and predicted audio data generated by the TTS component based on transcripts of the speech. The machine learning model may be pre-trained using the synthetic parallel dataset and fine-tuned using audio data representing target voice speech and predicted audio generated by the TTS component based on transcripts of the target voice speech. The trained model may be used to modify synthetic speech to approximate the characteristics of the target speech.

20 Claims, 15 Drawing Sheets

(56) References Cited

OTHER PUBLICATIONS

Adam Gabrys, et al., "Voice Filter: Few-Shot Text-to-Speech Speaker Adaptation Using Voice Conversion as a Post-Processing Module," 5 pages. Retrieved on May 22, 2023 from https://arxiv.org/pdf/2202.08164.pdf.

Tao Wang, et al., "Spoken Content and Voice Factorization for Few-Shot Speaker Adaptation." Interspeech 2020, pp. 796-800. Retrieved from https://www.isca-speech.org/archive_v0/Interspeech_2020/pdfs/1745.pdf.

Lifa Sun, et al., "Phonetic Posteriorgrams for Many-to-One Voice Conversion Without Parallel Data Training." 2016 IEEE International Conference on Multimedia and Expo (ICME), IEEE, Jul. 11, 2016, pp. 1-6. Retrieved on Aug. 25, 2016 from DOI: 10.1109/ICME.2016.7552917.

\* cited by examiner

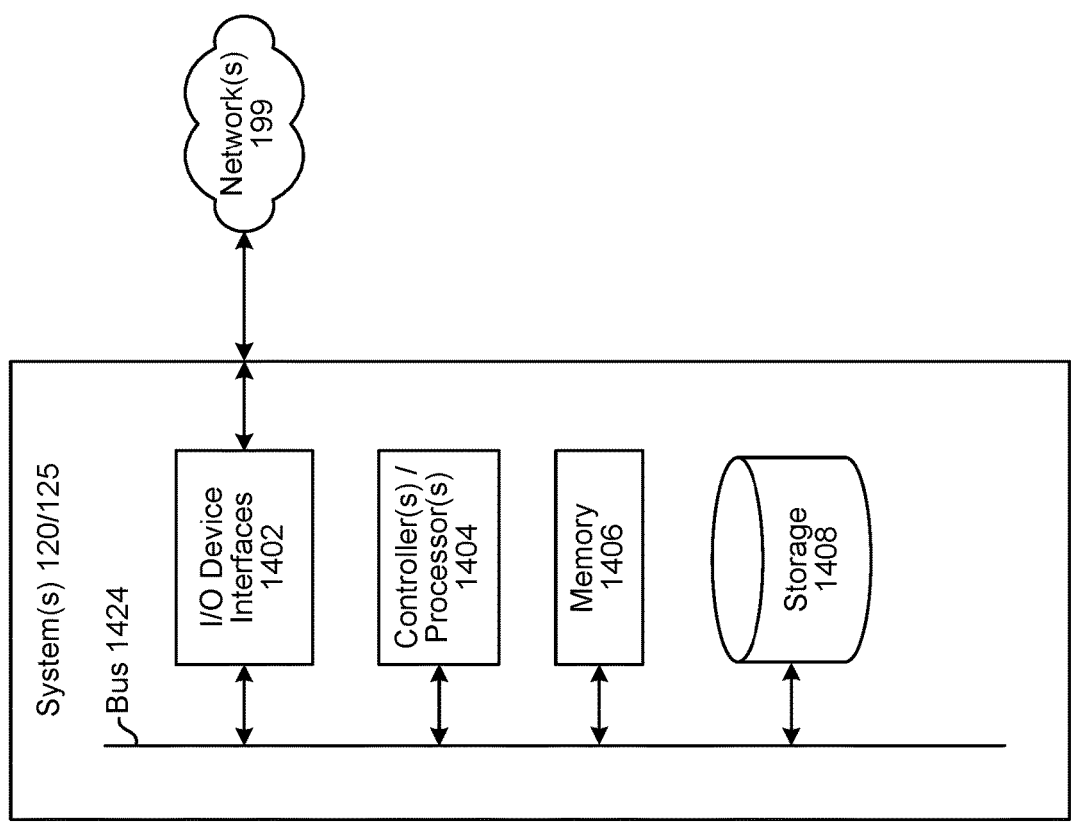

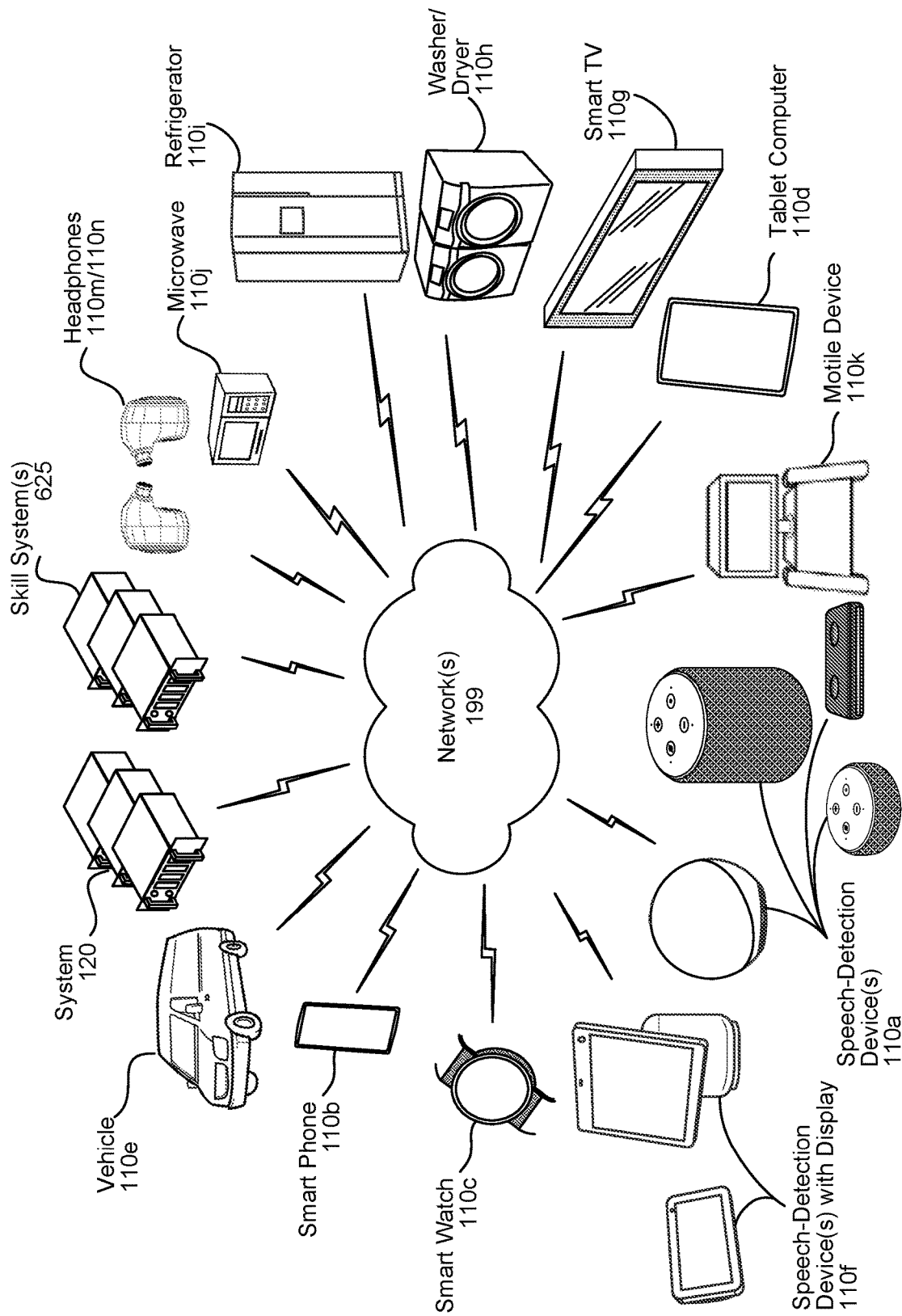

VOICE ADAPTATION USING SYNTHETIC SPEECH PROCESSING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 14 is a block diagram conceptually illustrating example components of a system, according to embodiments of the present disclosure.

FIG. 15 illustrates an example of a computer network for use with the overall system, according to embodiments of the present disclosure.

DETAILED DESCRIPTION

Figure 1:
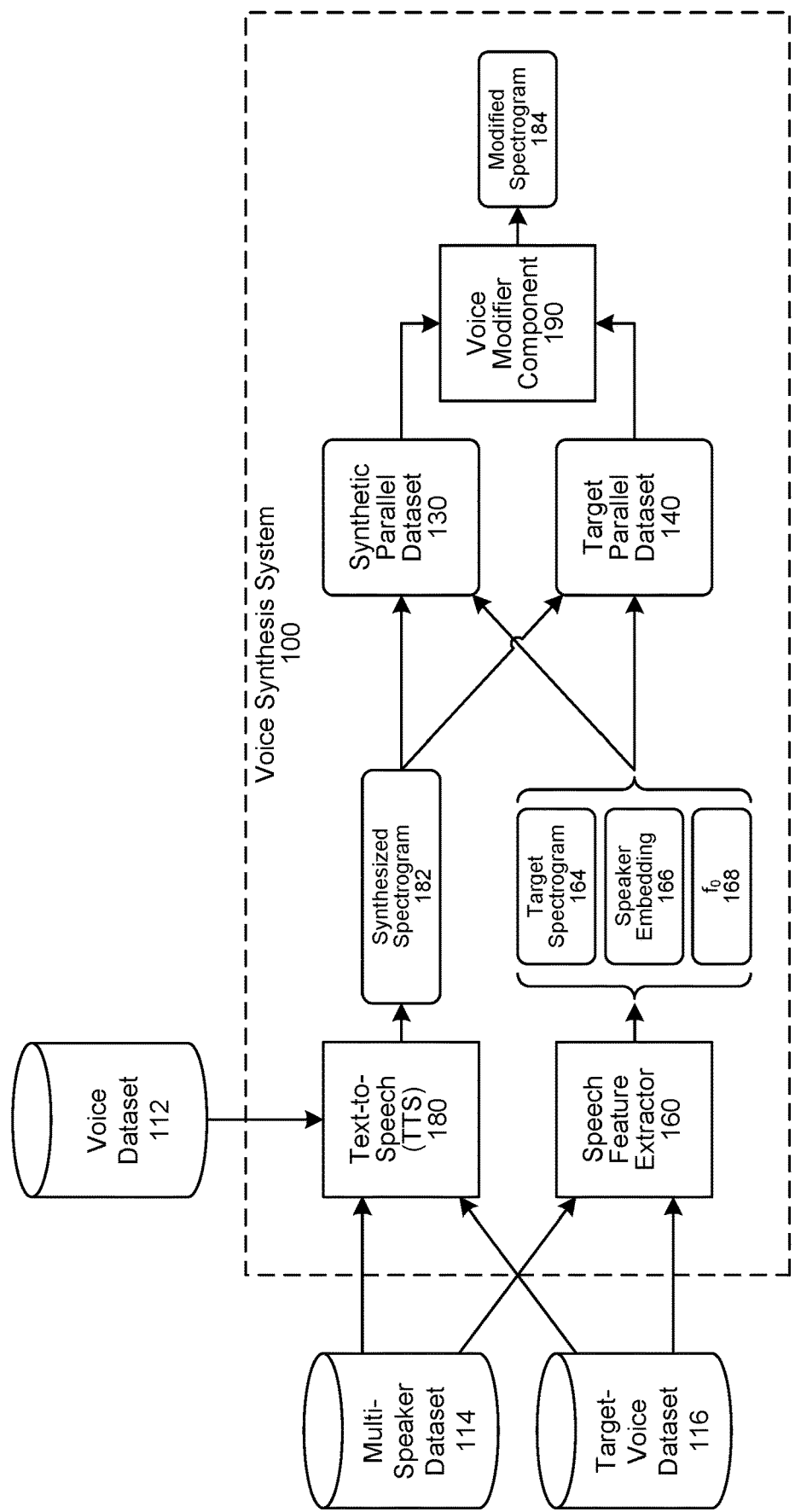
FIG. 1 is a conceptual diagram that illustrates generating parallel datasets for training various components of a voice synthesis system for voice adaptation using text-to-speech (TTS) processing, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing/virtual assistant system.

A TTS system may be trained using a training dataset including recorded speech and transcripts thereof. In some cases, the training dataset may include several hours of recorded speech data. When training data is limited, however, performance of resulting TTS models may suffer from reduced speech quality and intelligibility. Some uses of a TTS system may involve generating synthetic speech having certain voice characteristics; for example, generate synthesized speech that imitates the voice of a particular individual such as a celebrity, specific user, or the like. Another technique for machine generation of speech having specific voice characteristics involves voice conversion. Such voice conversion approaches may include training a voice conversion model to receive audio data representing speech (e.g., recorded speech and/or synthesized speech) having first voice characteristics, and modify the audio data to approximate different voice characteristics. Training such a voice conversion model, however, may suffer the same drawbacks as a TTS model (e.g., poor speech quality and/or intelligibility) if not trained with a sufficiently large dataset.

Offered are systems and methods for, among other things, training a voice-modifying model to generate synthesized speech that imitates characteristics of a target voice based on a much smaller reference dataset of the target voice than prior systems. A TTS system incorporating the voice-modifying model may be used to create customized synthesized speech for many different potential target voices. The techniques described herein may be particularly useful when only a limited number of examples are available of the speech whose characteristics are to be imitated. Training the voice-modifying model may include several stages including: training a TTS model (e.g., using a voice dataset corresponding to a single speaker), using the trained TTS model to generate a synthetic parallel dataset for pre-training the voice-modifying model, pre-training the voice-modifying model using the synthetic parallel dataset, and fine-turning the voice-modifying model using examples of the target voice. The resulting voice-modifying model may receive synthesized speech from the single-speaker TTS model and output modified synthesized speech having voice characteristics similar to the target voice.

First, a single-speaker TTS component may be trained with a large single-speaker corpus. The single-speaker corpus may include recorded speech and a corresponding transcript of the words spoken. The single-speaker TTS component may be trained to process the transcript to generate synthesized speech that approximates the recorded speech.

Second, the trained single-speaker TTS component may be used to generate a synthetic parallel dataset for a multi-speaker corpus. The multi-speaker corpus may include samples recorded speech from multiple speakers along with transcripts corresponding to the recorded speech. The multi-speaker corpus may include, for example, example speech of multiple or many speakers, with samples covering many or all phonemes for a particular language. The corpus may include transcript(s) of what the speakers are saying. The single-speaker TTS component may process the transcript to generate synthesized speech that may be used as an input for training the voice-modifying model. The recorded speech may serve as target speech for the training (e.g., the target speech may be used to evaluate the output of the voice-modifying model during training). The synthesized speech and target speech (as well as voice characteristics determined from the recorded speech) form the synthetic parallel dataset used to pre-train the voice-modifying model.

Third, the voice-modifying model may be pre-trained using the synthetic parallel dataset. Pre-training the voice-modifying model may configure it to receive synthesized speech from the TTS component and modify the synthesized speech according to given voice characteristics to output voice-modified speech that approximates the given voice characteristics. For each example in the synthetic parallel dataset, the voice-modifying model may process the corresponding synthesized speech and voice characteristics to generate voice-modified speech. Parameters of the voice-modifying model may be adjusted based on a loss calculated between the voice-modified speech and the corresponding target speech.

Finally, the pre-trained voice-modifying model may be fine-tuned using examples of the target voice. Fine-tuning the voice-modifying model may configure it to receive synthesized speech from the single-speaker TTS component and generate voice-modified speech that sounds like the target voice. For the fine-tuning, the single-speaker TTS component may process a transcript of the examples of the target voice to generate synthesized speech. The voice-modifying model may process synthesized speech and target voice characteristics to generate voice-modified speech. The voice-modified speech may be compared to the corresponding examples of the target voice. The voice-modifying model may be adjusted based on a difference between the voice-modified speech and the target voice. As a result of the fine-tuning, the voice-modifying model may be configured to receive synthesized audio from the single-speaker TTS component and output voice-modified audio with voice characteristics approximating the target voice characteristics; that is, to output synthesized speech that sounds as though it was spoken by the same speaker as target voice.

Thus, the TTS system incorporating the voice-modifying model may be used to create customized synthesized speech for many different potential target voices. Moreover, the TTS system including the voice-modifying model may be trained to generate an approximation of the target voice using only a small amount of reference data, which in turn may be based on a much smaller dataset than would be practical/possible using other techniques.

The systems and methods for voice adaptation using TTS processing described herein can outperform other techniques for few-shot speech synthesis based on similar amounts of target voice training data, while also being competitive against TTS models built on a much larger target voice dataset.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 2:
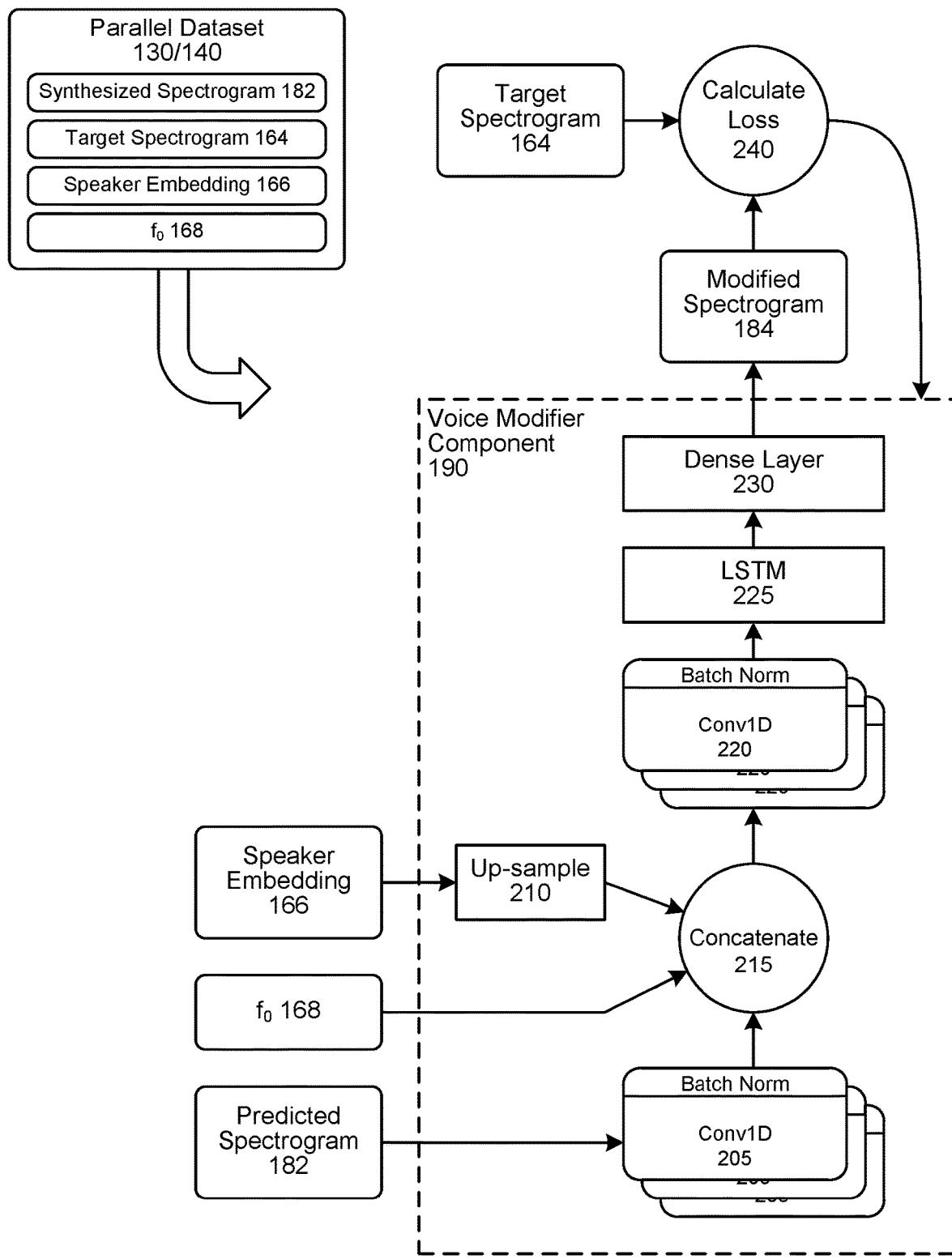
FIG. 2 illustrates further details of training a voice modifier component of the voice synthesis system, according to embodiments of the present disclosure.
Figure 3:
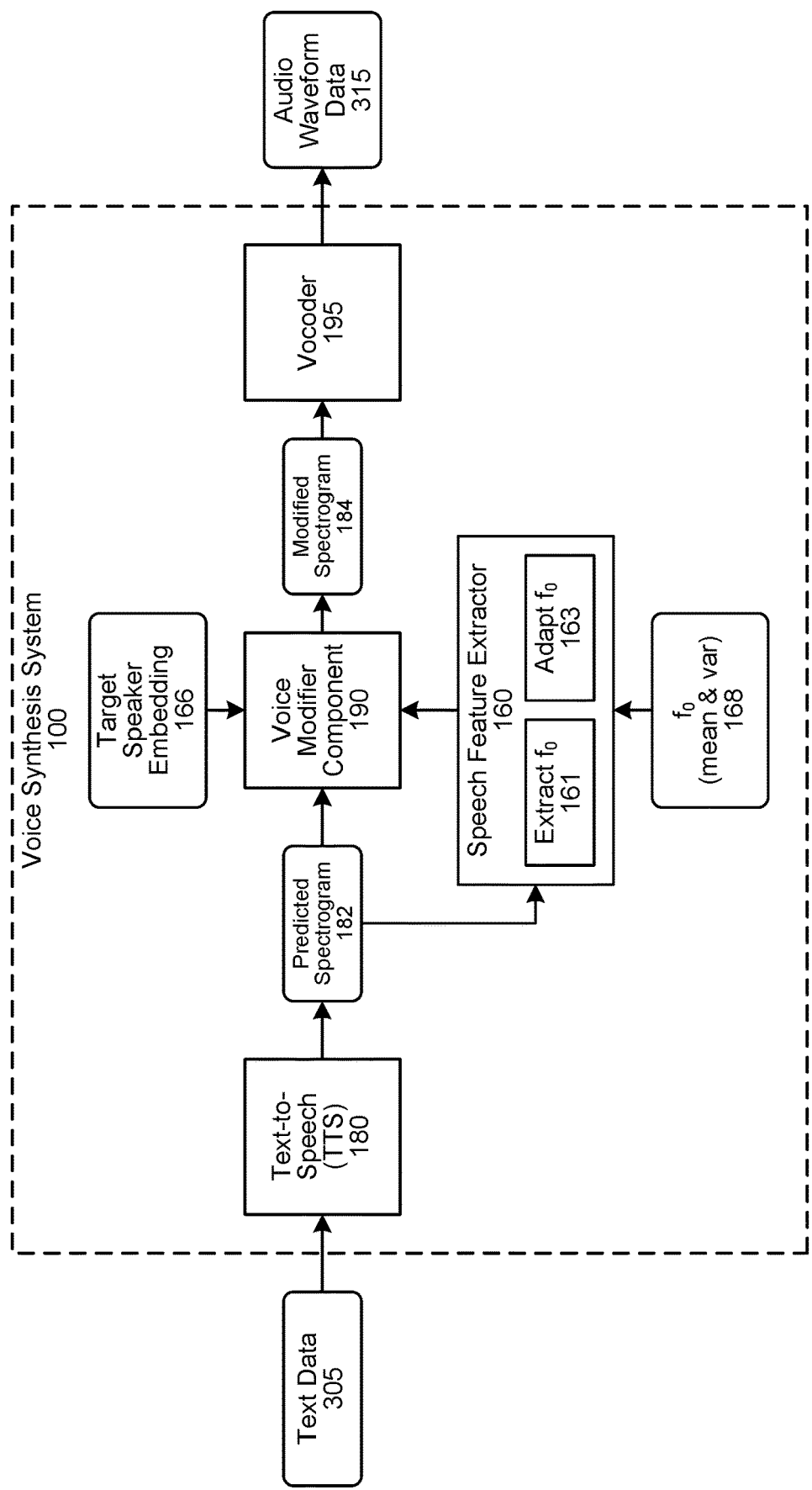
FIG. 3 is a conceptual diagram illustrates operations of the voice synthesis system performing voice adaptation using TTS processing, according to embodiments of the present disclosure.

FIGS. 1-3 describe training and use of a voice modifier component 190 in a voice synthesis system 100 for voice adaptation using text-to-speech (TTS) processing, according to embodiments of the present disclosure. The voice synthesis system 100 may include or be a part of a natural language command processing system, such as the system 600 shown in FIG. 6. FIG. 1 is a conceptual diagram that illustrates training various components of the voice synthesis system 100, including a TTS component 180 and the voice modifier component 190. Once trained, the TTS component 180 and the voice modifier component 190 may, for any arbitrary text, synthesize speech that approximates the voice characteristics of the target voice.

The TTS component 180 may include one or more machine learning models configured to generate synthesized speech based on received text. The text may be, for example, from a book, website, periodical, scanned document, an application, and/or a natural language generation system such as the NLG component 679. An example TTS component 180 architecture is described below with reference to FIG. 7. In some implementations, the TTS component 180 may be trained using a large voice dataset 112. The voice dataset 112 may include, for example, 10 hours of high-quality (e.g., high-fidelity and/or low noise) speech data representing words read or otherwise spoken in a neutral speaking style by a US English speaker (or speakers). The voice dataset 112 may additionally include transcripts corresponding to such speech. In some implementations, an ASR component (e.g., such as the ASR component 650 described herein) may generate a transcript of the speech contained in the voice dataset 112. The TTS component 180 may generate synthesized speech corresponding to the transcripts, and parameters of the one or more machine learning models of the TTS component 180 may be adjusted to bring the synthesized speech into convergence with the target speech (e.g., using algorithms such as gradient descent and/or back propagation). Once trained using the voice dataset 112, the TTS component 180 may be used to generate a synthetic parallel dataset 130 based on the multi-speaker dataset 114, as described further below.

The multi-speaker dataset 114 may include examples of speech of various different speakers. The multi-speaker dataset 114 may additionally include transcripts corresponding to such speech. In some implementations, an ASR may generate a transcript of the speech contained in the multi-speaker dataset 114. The multi-speaker dataset 114 may include, for example, example speech of 120 gender-balanced male and female US English speakers, with approximately 40 minutes of data per speaker having complete phonetic coverage. To generate the synthetic parallel dataset 130, the TTS component 180 may generate synthesized speech corresponding to the target speech contained in the multi-speaker dataset 114. The TTS component 180 may generate the synthesized speech in the form of synthesized spectrogram data 182. Spectrogram data as discussed herein may include Mel-spectrograms having 80, 100, 120, etc. bins. The target speech of the multi-speaker dataset may also be in the form of a spectrogram (e.g., the target spectrogram 164). Alternatively, the target speech may be in the form of waveform data, and a speech feature extractor component 160 may generate the target spectrogram 164 based on the waveform data.

The speech feature extractor component 160 may determine voice characteristic data of the target speech. The voice characteristic data may include speaker embedding data 166 and/or frequency data ("$f_0$") 168 of the target speech. In some implementations, the speech feature extractor component 160 may determine other voice characteristic data such as data regarding prosody, accent, energy, speaking style, and/or speaker type (e.g., sex, age, etc.). The speaker embedding data 166 may be data that represents identifiable characteristics of a particular speaker. For example, a neural network or other machine learning model trained to identify speakers based on voice characteristics may include an encoder or other network configured to generate hidden state data that can be used by a decoder, classifier, or other such network to identify the speech as potentially corresponding to a particular speaker. Such hidden state data from the model may be referred to as the speaker embedding data 166. To generate the speaker embedding data 166, the speech feature extractor component 160 may be trained, for example, on the multi-speaker dataset 114, and optimized on a Generalized End-to-End Loss. The frequency data 168 may include pitch and/or pitch contour information that indicates a fundamental frequency of the speech and/or any modulation of pitch (e.g., upward or downward inflections). For example, the frequency data 168 may include a fundamental frequency "$f_0$" representing a pitch of the speech. Pitch can refer to the auditory precept of tone. Although speech may present a complex signal (e.g., multiple sinusoids of different frequency), a listener may recognize a sinusoid as being the same pitch as the complex signal. The fundamental frequency $f_0$ may be a quantity that represents the sinusoid that a listener may perceive as matching the pitch of the speech. The speech feature extractor component 160 may include a pitch tracker configured to estimate the fundamental frequency $f_0$ of a speech sample. The fundamental frequency $f_0$ may represent an inherent property of a periodic signal, and correlates well with perceived pitch. In some implementations, it may be calculated as the inverse of the smallest period in the interval of speech being analyzed. The frequency data 168 may include mean and/or variance information related to the fundamental frequency $f_0$; for example, the mean may represent the relative pitch of a voice compared to others (e.g., deeper or higher) and a variance may represent the relative tendency of a speaker to modulate their speech (e.g., more monotone versus more melodic). The speech feature extractor component 160 may, for example, extract the frequency data 168 from the speech recordings (e.g., datasets 112, 114, and/or 116) in the form of a log-$f_0$ contour using the RAPT algorithm of the Speech Processing Toolkit (SPTK2) with a threshold of 0 for the voice/unvoiced regions. In some implementations, the speaker embedding data 166 may be in the form of vector data, such as the user recognition feature vector data 1240 used for user recognition in the user recognition component 695. An example of using speaker embeddings for user recognition is described in further detail below with reference to FIG. 12.

The synthetic parallel dataset 130 may thus consist of the synthesized spectrogram data 182, the target spectrogram 164, the speaker embedding data 166, and/or the $f_0$ 168. The synthetic parallel dataset 130 may be used to pre-train the voice modifier component 190. Such pre-training may configure the voice modifier component 190 to generate voice-modified speech (e.g., a modified spectrogram data 184) approximating a target voice based on received voice characteristic data. Details of pre-training and fine-tuning of the voice modifier component 190 are described further below with reference to FIG. 2.

The TTS component 180 and speech feature extractor component 160 can generate a target parallel dataset 140 in a manner similar to the synthetic parallel dataset 130. The voice synthesis system 100 may receive a target-voice dataset 116 containing examples of the target voice. The target-voice dataset 116 may additionally include transcripts corresponding to the target speech. In some implementations, an ASR may generate a transcript of the speech contained in the target-voice dataset 116. As with the multi-speaker dataset 114, the TTS component 180 may generate a synthesized spectrogram data 182, and the speech feature extractor component 160 may determine voice characteristic data of the target speech including speaker embedding data 166 and/or frequency data 168 of the target speech. The target parallel dataset 140 may thus consist of the synthesized spectrogram data 182, the target spectrogram 164, the speaker embedding data 166, and/or the $f_0$ 168 for utterances in the target-voice dataset 116. The target parallel dataset 140 may be used to fine-tune the voice modifier component 190 to generate a modified spectrogram data 184 approximating the target voice. Details of pre-training and fine-tuning of the voice modifier component 190 are described further below with reference to FIG. 2.

FIG. 2 illustrates further details of training a voice modifier component 190, according to embodiments of the present disclosure. The voice modifier component 190 may be pre-trained using the synthetic parallel dataset 130, and fine-tuned using the target parallel dataset 140. Because training operations may be similar in each case, training is described with respect a parallel dataset 130/140 (e.g., which may represent either/both parallel datasets 130/140). The parallel dataset 130/140 may include the synthesized spectrogram data 182 (e.g., as generated by the TTS component 180 based on a transcript corresponding to the target speech), a target spectrogram 164 (representing a recording of the target speech), speaker embedding data (e.g., representing identifiable characteristics of the target speech), and/or frequency data 168 (e.g., representing pitch information corresponding to the target speech). The voice modifier component 190 may receive the speaker embedding data 166, the frequency data 168, and the synthesized spectrogram data 182, and output voice-modified spectrogram data 184. A component 240 may calculate loss (e.g., an L1 loss) between the modified spectrogram data 184 and the target spectrogram 164. The loss may be used to adjust parameters of various models/networks of the voice modifier component 190 (e.g., using algorithms such as the ADAM (adaptive moment estimation) optimizer, gradient descent, and/or back propagation).

In some implementations, the voice modifier component 190 may include various neural network models/layers that process the speaker embedding data 166, the frequency data 168, and the synthesized spectrogram data 182 to generate the voice-modified spectrogram data 184. The inputs and outputs may be, for example, 80-bin Mel-spectrograms of equal length. The voice modifier component 190 may process the inputs with one or more convolutional neural network layers 205 and 220; for example, a 6-stack of size-preserving 1-dimensional convolutions with 512 channels and a kernel size of 5 with batch-normalization. The convolution layers 205 and 220 may be followed by a recursive neural network (RNN) such as a uni-directional long short-term memory network (LSTM) 225 and a dense layer 230 with, for example, 1024 nodes. A concatenation component 215 may concatenate a hidden representation of the third convolutional layer 205 with the speaker embedding data 166 (e.g., up-sampled via an up-sampling component 210) and the frequency data 168. The speaker embedding data 166 may be, for example, a 256-dimensional vector defined at the utterance level and broadcasted at the frame level. The frequency data 168 may be in the form of, for example, a log-$f_0$ contour. The frequency data 168 may help the model better absorb prosodic differences between synthesized speech and the target speaker. Thus, training of the voice modifier component 190 may be focused on modifying speaker-defining information rather than adjusting prosody information between source and target speakers.

As described above, training the voice modifier component 190 may be performed in two stages: pre-training and fine-tuning. The pre-training stage may include performing training the model(s) of the voice modifier component 190 in a one-to-many fashion for one million steps on the synthetic parallel dataset 130. While the resulting pre-trained model may be capable of converting synthesized speech to that of any of the speakers in the multi-speaker dataset, it may not be robust enough to generalize to new speakers (e.g., not represented in the datasets 112/114) without further processing. The fine-tuning stage may include adapting the pre-trained model to the target speaker using the target-voice dataset 116, which may include a much more limited number of examples of the target voice than what may be present in the multi-speaker dataset 114 and/or the voice dataset 112; for example, one minute of speech in the target-voice dataset 116 versus one to two hours of speech for each speaker represented in the multi-speaker corpus and ten or more house of speech in the single-speaker corpus. Thus, the second stage may include fine-tuning some, most, or all of the parameters of the pre-trained model for 1,000 steps on the target-voice dataset 116 in a one-to-one fashion. In some implementations, the centroid of the utterance-level speaker embedding data 166 may be used in fine-tuning, rather than using individual speaker embedding data 166 for each utterance in the target-voice dataset 116. Using the centroid of the speaker embedding data 166 may result in a more stable model.

Figure 6:
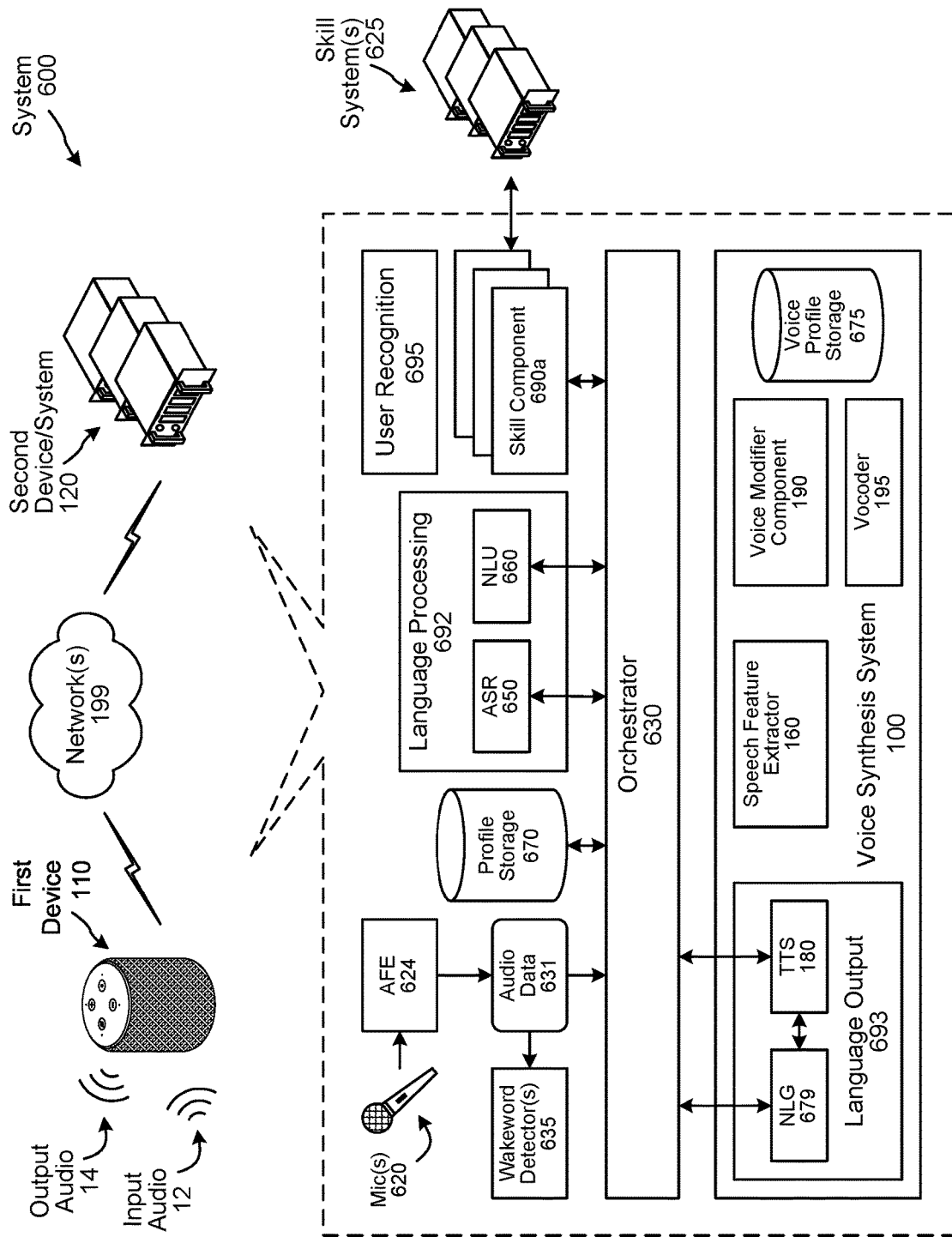
FIG. 6 is a conceptual diagram of components of the system, according to embodiments of the present disclosure.

The voice modifier component 190 may be trained to imitate additional target voices. In some cases, the voice modifier component 190 may generate synthesized speech that imitates a new target voice based on voice characteristic data (e.g., and without retraining the voice modifier component 190 using a new target parallel dataset). The voice synthesis system 100 may, however, produce more accurate representations of the target voice when the voice modifier component 190 is retrained using the new target parallel dataset to repeat the operations of fine-tuning described above. In any case, data regarding the target voice characteristics including the speaker embedding data 166, the frequency data 168, and/or target voice-specific parameters of the voice modifier component 190 may be stored in the form of a voice profile; for example, in a voice profile storage 675 as shown in FIG. 6.

FIG. 3 is a conceptual diagram illustrates operations of the voice synthesis system 100 performing voice adaptation using TTS processing, according to embodiments of the present disclosure. The trained TTS component 180 and voice modifier component 190 may be used to convert text data 305 to synthesized speech approximating the target voice. While the examples described herein use text data as an input, the input may take other forms such as symbols or characters representing phonemes, senons, phones, and/or other representations that have distinct representations for homonyms and/or that are language-independent. The system 100 may receive (or generate) the text data 305 and provide it to the TTS component 180. The TTS component 180 may generate synthesized speech in the form of a synthesized spectrogram data 182, which may be send to the voice modifier component and/or the speech feature extractor component 160. The speech feature extractor component 160 may include software and/or logic 161 configured to extract frequency data ("$f_0$") from the synthesized spectrogram data 182. The speech feature extractor component 160 may include software and/or logic 163 configured to adapt the frequency data to approximate frequency data 168 previously determined for the target voice (e.g., the mean and variance of the target speech's $f_0$). The speech feature extractor component 160 may provide the adapted frequency data to the voice modifier component 190. The voice modifier component 190 may receive the synthesized spectrogram data 182, the adapted frequency data, and the target speaker embedding 166 of the target voice and generate a modified spectrogram data 184. The modified spectrogram data 184 may represent the same speech as the synthesized speech represented by the synthesized spectrogram data 182, but voice-modified to approximate the voice characteristics of the target voice. A vocoder component 195 may receive the modified spectrogram data 184 and generate audio waveform data 315. The vocoder component 195 may be, for example, a universal neural vocoder based on Parallel WaveNet. The vocoder component 195 may take as input audio data in the form of, for example, a Mel-spectrogram with 80 coefficients and frequencies ranging from 50 Hz to 12 kHz. The audio waveform data 315 may be a time-domain audio format (e.g., pulse-code modulation (PCM), waveform audio format (WAV), μ-law, etc.) that may be readily converted to an analog signal for amplification and output by a loudspeaker, such as the loudspeaker 1312 shown in FIG. 13. The audio waveform data 315 may consist of, for example, 8-, 16-, or 24-bit audio having a sample rate of 16 kHz, 24 kHz, 44.1 kHz, etc. In some implementations, other bit and/or sample rates may be used.

The voice synthesis system 100 may perform voice modification in various situations. For example, the voice synthesis system 100 may be used in conjunction with translation (e.g., neural machine translation of source text and/or speech) to modify voice characteristics of synthesized speech. The voice synthesis system 100 may generate synthesized speech in a second language, where the synthesized speech has voice characteristics similar to those of the original speech spoken in a first language. For example, an audio book may be read by a speaker in a first language. The voice synthesis system 100 may extract voice characteristic data from the original speech. The text of the book and/or the audio data may be translated into a second language. The voice synthesis system 100 may generate synthesized speech in the second language based on the translated text. (Additionally or alternatively, the voice synthesis system 100 may receive synthesized speech in the second language from a component and/or system that translates speech directly.) The voice synthesis system 100 may then modify the synthesized speech using the voice characteristic data (e.g., speaker embedding data 166 and/or fundamental frequency data 168) extracted from the original speech. The voice synthesis system 100 may thus cause the resulting modified synthesized speech to sound similar to the original speaker, despite the difference in language. The voice synthesis system 100 may dub video by a similar process. The voice synthesis system 100 may receive text and/or synthesized speech in a second language, and generated modified synthesized speech using voice characteristic data extracted from the original, first-language speech.

Figure 4:
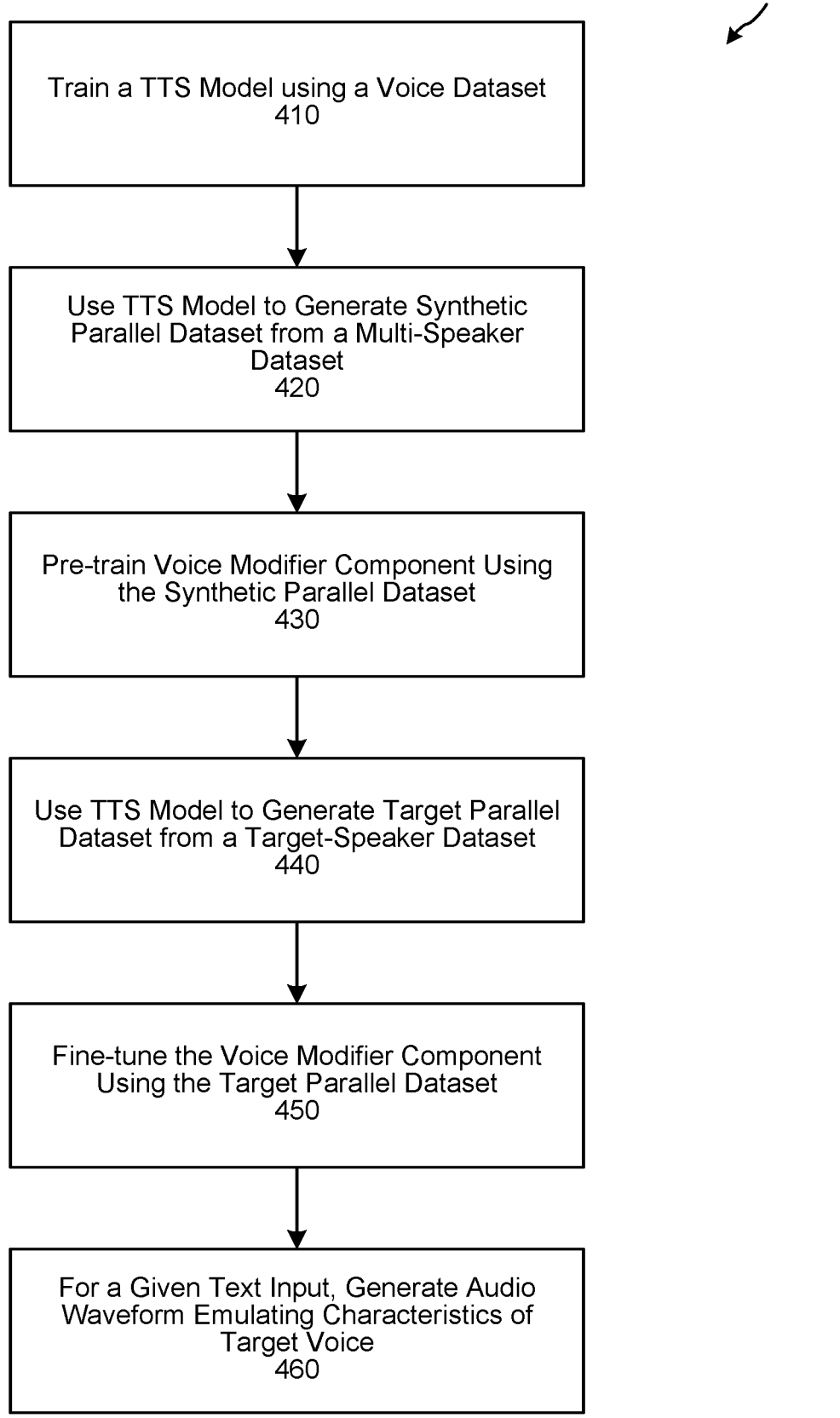
FIG. 4 is a flowchart illustrating an example method of training a voice modification component and using it to perform voice adaptation using TTS processing to imitate voice characteristics of a target voice, according to embodiments of the present disclosure.

FIG. 4 is a flowchart illustrating an example method 400 of training a voice modifier component 190 of the voice synthesis system 100 and using it to perform voice adaptation using TTS processing to generate synthesized speech that imitates voice characteristics of a target voice, according to embodiments of the present disclosure.

The method 400 may include training a TTS model using a single-speaker dataset (stage 410). The TTS model may be a neural network within the TTS component 180. The single-speaker dataset may include several to many hours of high-quality audio data (e.g., studio quality with low background noise and high fidelity) corresponding to a single speaker. The speaker in the single-speaker dataset may be different from the speaker providing the target voice (e.g., because the purpose of the voice modifier component 190 is to convert the voice characteristics of the synthesized speech generated by the TTS component 180 to approximate the voice characteristics of the target voice). The TTS model may be trained by generating synthesized speech based on a transcript of the speech in the single-speaker dataset, and calculating a loss between the synthesized speech and the recorded speech.

The method 400 may include using TTS model to generate synthetic parallel dataset from a multi-speaker dataset (stage 420). Once trained using the large, single-speaker dataset, the TTS model may be used to generate the dataset that will be used to pre-train the model(s) of the voice modifier component 190. The system 100 may receive a multi-speaker dataset consisting of recorded speech corresponding to multiple different speakers (e.g., 1-2 hours per speaker). The speakers of the multi-speaker dataset may be different from the speaker of the target voice (e.g., because the purpose of pre-training the voice modifier component 190 using the multi-speaker dataset is to use extensive examples of different speakers' voices to configure it to generate synthesized speech that imitates the target voice based on more limited examples of the target voice). The TTS component 180 may generate synthesized speech from a transcript of the speech in the multi-speaker dataset. The recorded speech will serve as target speech for training the voice modifier component 190 pre-training, and the synthesized speech will serve as predicted speech. In addition, the speech feature extractor component 160 will extract voice characteristic data (e.g., speaker embedding data and frequency data) from each speaker and/or utterance in the multi-speaker dataset. The synthesized speech and target speech (e.g., in the form of spectrogram data) as well as the speaker embedding data and frequency data will make up the synthetic parallel dataset.

The method 400 may include pre-training the voice modifier component 190 using the synthetic parallel dataset (stage 430). The voice modifier component 190 may receive the synthesized spectrogram data and the voice characteristic data generated during the stage 420, and train a trained model to output voice-modified spectrogram data approximating the corresponding target spectrogram data. For each speaker represented in the synthetic parallel dataset (e.g., having a respective target spectrogram, synthesized spectrogram, and voice characteristic data), a loss may be calculated between the voice-modified spectrogram data and the target spectrogram data, and parameters of the voice modifier component 190 models may be adjusted to reduce the calculated loss. The resulting pre-trained model may be fine-tuned to modify synthesized speech to generate voice-modified spectrogram data having voice characteristics similar to those of the target voice.

The method 400 may include using the TTS model to generate target parallel dataset from a target-speaker (stage 440). Once the TTS model is trained using the single-speaker dataset, it may also be used to generate a parallel dataset for the target voice. The system 100 may receive the target-speaker dataset consisting of recorded speech corresponding to the target voice. This dataset may be much smaller than the single-speaker or multi-speaker datasets, and may consist of as little as a minute or less of the target speech; however, it may be beneficial to obtain examples of the target speech with full phonetic coverage). The TTS component 180 may generate synthesized speech from a transcript of the speech in the target-speaker dataset. The transcript may be provided to the target speaker (e.g., for them to read to generate the recorded speech of the target-voice recording) or may be determined using ASR. The recorded speech will serve as the target speech for training the voice modifier component 190 fine-tuning, and the synthesized speech will serve as the synthesized speech. In addition, the speech feature extractor component 160 will extract voice characteristic data (e.g., speaker embedding data and frequency data) from the target voice. The synthesized speech and target speech (e.g., in the form of spectrogram data) as well as the speaker embedding data and frequency data will make up the target parallel dataset. In some implementations, a single speaker embedding (e.g., representing a centroid of the speaker embedding data extracted from the whole target-speaker dataset) may be used for the voice modifier component 190 fine-tuning, rather than individual speaker embedding data determined for each utterance of the target-speaker dataset.

The method 400 may include the fine-tuning the voice modifier component 190 using the target parallel dataset (stage 450). Voice modifier component 190 fine-tuning may proceed in a manner similar to pre-training, with the voice modifier component 190 taking the synthesized speech and voice characteristic data as input, and generating voice-modified speech as output. A loss maybe calculated between the voice-modified speech and the target speech, and model parameters of the voice modifier component 190 adjusted to reduce the loss.

The method 400 may include generating audio waveform that imitates characteristics of target voice for a given text input (stage 460). While the examples described herein use text data as an input, the input may take other forms such as symbols or characters representing phonemes, senons, phones, and/or other representations that have distinct representations for homonyms and/or that are language-independent. With the voice modifier component 190 pre-trained and fine-tuned according to various stages of the method 400, it may be used to generate, for a given text input, audio data imitating the voice characteristics of the target voice. Operations for synthesizing speech having voice characteristics approximating those of the target voice are described below with reference to FIG. 5.

Figure 5:
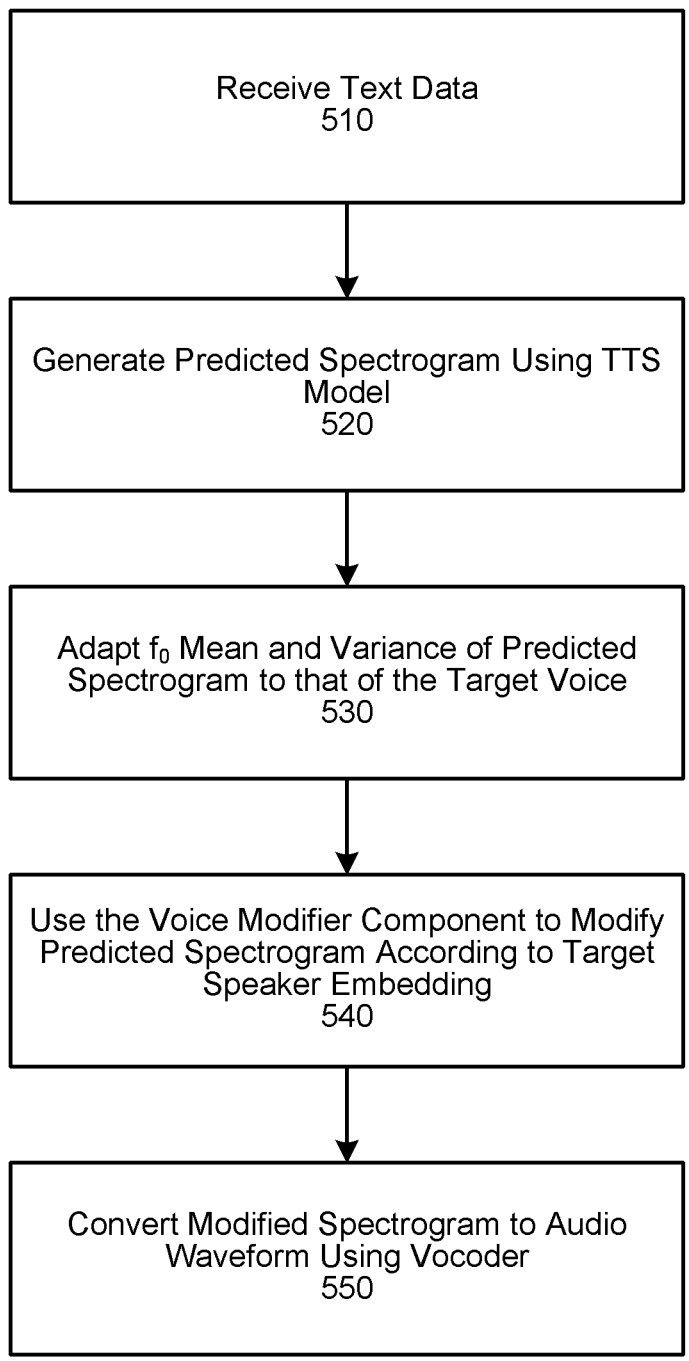
FIG. 5 is a flowchart illustrating an example method of generating an audio waveform that imitates voice characteristics of the target voice using the trained voice modifier component, according to embodiments of the present disclosure.

FIG. 5 is a flowchart illustrating an example method 500 of generating an audio waveform imitating voice characteristics of the target voice using the trained voice modifier component 190 of the voice synthesis system 100, according to embodiments of the present disclosure. The method 500 may include receiving text data (stage 510). While the examples described herein use text data as an input, the input may take other forms such as symbols or characters representing phonemes, senons, phones, and/or other representations that have distinct representations for homonyms and/or that are language-independent. The text data (or other input data) may be provided by a user who, for example, wishes to generate synthesized speech according to a script. Additionally or alternatively, the text data may be generated by a skill component and/or NLG component as described in further detail below (e.g., with reference to FIG. 6).

The method 500 may include generating synthesized spectrogram data using the TTS model (stage 520). The TTS component 180 may receive the text data and generate synthesized speech using, for example, the TTS model previously trained during the stage 410. The synthesized speech may be in the form of spectrogram data.

The method 500 may include adapting the fundamental frequency ("$f_0$") of the synthesized speech to that of the target voice (stage 530). The synthesized speech may have a fundamental frequency (e.g., pitch and/or timbre), which may be constant or have some contour (e.g., an upward and/or downward contour). The speech feature extractor component 160 may determine a mean and/or variance of the fundamental frequency of the synthesized speech. The speech feature extractor component 160 may compare the fundamental frequency mean and/or variance of the synthesized speech to that of the target voice. The synthesized speech may thus be modified such that fundamental frequency mean and/or variance matches or approximates the target voice.

The method 500 may include using the voice modifier component 190 to modify the synthesized spectrogram data according to the target speaker embedding (stage 540). The voice modifier component 190 may receive the synthesized speech (e.g., the predicted spectrogram) and the voice characteristic data of the target voice (e.g., the speaker embedding data). The voice modifier component 190 may process the input to generate voice-modified synthesized speech having voice characteristics similar to the target voice.

The method 500 may include converting modified spectrogram to audio waveform using a vocoder (stage 550). The voice-modified synthesized speech generated during the stage 540 may be in the form of spectrogram data. Thus, the system 100 may, using the vocoder component 195, convert the spectrogram data to an audio waveform signal (e.g., an analog signal) suitable for amplification and output as an audible signal. The system 100 may then cause a device to output the audible signal via a loudspeaker 1312.

The voice synthesis system 100 may be included in a speech-processing system 600 as shown in FIG. 6. FIG. 6 is a conceptual diagram illustrating a high level overview of example components of the system 600 including features for processing natural language commands, according to embodiments of the present disclosure. In addition to the components previously described in the context of acoustic event detection, the system 600 may include components for performing speech processing and synthesis, as well as for responding to natural language commands. The system 600 may include a wakeword detector 635, an orchestrator component 630, a profile storage 670, language processing components 692 including an ASR component 650 and an NLU component 660, and/or one or more skill components 690a, 690b, 690c, etc. (collectively "skill components 690"), which may be in communication with one or more skill support systems 625. In addition, the system 600 may include the voice synthesis system 100, which may additionally include language output components 693 such as an NLG component 679 and the TTS component 180, the speech feature extractor component 160, voice modifier component 190, and the vocoder component 195. The system 600 may provide output to a user in the form of synthesized speech, notification sounds, or other output audio 14.

The components may reside in the device 110 and/or second device/system 120 such that various functionality described herein may be performed by the device 110, the second device 120, or may be divided or shared between the two. For example, in some cases, the device 110 may process audio data locally, whereas in other cases the device 110 may send audio data to the system 120 for processing. In some implementations, the first device 110 may perform initial processing of audio and/or other input data, and send a form of intermittent data to the second device/system 120. The intermittent data may include ASR data (such that audio data including a user's voice need not be sent from the user's device 110), update data pertaining to various models used by the first device 110, and/or commands to skill components 690, etc.

The system 600 may receive input audio 12 via a microphone or microphone array 620. An acoustic front end (AFE) 624 may process the audio signal from the microphone(s) 620 to generate audio data 631. In some implementations, the system 600 may include multiple AFEs 624. For example, the AFE 624 providing audio data 631 to an acoustic event detection (AED) component may differ from the AFE 624 providing audio data to the wakeword detector 635. This may be due to the AED components having a different context window from the wakeword detector 635. For example, the wakeword acoustic-feature data may correspond to three seconds of audio data, while the AED acoustic-feature data may correspond to ten seconds of audio data.

The system 600 may process the audio data 631 to determine whether speech is represented therein. The system 600 may use various techniques to determine whether the input audio data 631 includes speech. In some examples, a voice-activity detector may apply voice-activity detection (VAD) techniques. Such VAD techniques may determine whether speech is present in audio data 631 based on various quantitative aspects of the input audio data 631, such as the spectral slope between one or more frames of the audio data; the energy levels of the audio data in one or more spectral bands; the signal-to-noise ratios of the audio data in one or more spectral bands; or other quantitative or qualitative aspects. In other examples, the system 600 may include a classifier configured to distinguish speech from background noise. The classifier may be implemented by techniques such as linear classifiers, support vector machines, and decision trees. In still other examples, the system 600 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The wakeword detector(s) 635 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detector 635 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

In various embodiments, the wakeword detector(s) 635 may use one of a plurality of wakeword-detection models. Each model may be trained to detect a different wakeword. In some embodiments, a single model may detect multiple wakewords. Each wakeword may be associated with a different speech-processing system and/or different speech-processing system configurations (e.g., representing different virtual assistants available to the user via the system 600). Upon detection of a particular wakeword, the system 600 may process the audio data 631 by the corresponding speech-processing system configuration.

In various embodiments, the wakeword-detection model of the wakeword detector(s) 635 is implemented to detect wakewords spoken in different accents corresponding to different countries, regions, or other areas. For example, the wakeword-detection model may be implemented to detect the wakeword "Alexa" whether it is spoken in an Indian, Scottish, or Australian accent. The wakeword-detection model may be also implemented to detect other wakewords in other languages; these other languages may have similar variations in accents that the wakeword-detection model may be similarly implemented to detect.

The wakeword detector(s) 635 may determine a similarity score for the candidate wakeword based on how similar it is to the stored wakeword; if the similarly score is higher than the wakeword-detection threshold, the wakeword detector 635 may determine that the wakeword is present in the audio data, and if the similarity score is less than the wakeword-detection threshold, the wakeword detector 635 may determine that the wakeword not is present in the audio data. For example, if the candidate wakeword matches the stored wakeword very closely, the wakeword detector 635 may determine a similarity score of 100; if the candidate wakeword does not match the stored wakeword at all, the wakeword detector 635 may determine a similarity score of 0. If the wakeword detector 635 determines candidate wakeword partially matches the stored wakeword, it may determine an intermediate similarity score, such as 75 or 85. Though the disclosure herein describes a similarity score of 0-100, wherein zero is least similar and 100 is most similar. The present disclosure is not limited to any particular range of values of the similarity score, and any system or method of determining similarity between a candidate wakeword represented in captured audio data and a stored representation of the wakeword is within the scope of the present disclosure.

Once a wakeword is detected by the wakeword detector(s) 635, the system 600 may begin processing speech represented in the audio data 631. The system 600 may send the audio data 631 to an orchestrator component 630. The orchestrator component 630 may include memory and logic that enables it to transmit various pieces and forms of data to various components of the system, as well as perform other operations as described herein. The orchestrator component 630 may be or include a speech-processing system manager, which may be used to determine which, if any, of the language processing components 692, language output components 693, and/or skill components 690 should receive and/or process the audio data 631 and/or data derived therefrom (e.g., by ASR, NLU, and/or entity resolution).

In some embodiments, the orchestrator component 630 and/or speech-processing system manager communicate with the language processing components 692 using an application programming interface (API). The API may be used to send and/or receive data, commands, or other information to and/or from the language processing components 692. For example, the orchestrator component 630 may send, via the API, the input audio data 631 to language processing components 692 elected by the speech-processing system manager and may receive, from the selected language processing components 692, a command and/or data responsive to the audio data 631.

The language processing components 692 may include an ASR component 650, which may transcribe the input audio data 631 into text data. The text data output by the ASR component 650 may represent one or more than one (e.g., in the form of an N-best list) ASR hypotheses representing speech represented in the input audio data 631. The ASR component 650 may interpret the speech in the input audio data 631 based on a similarity between the audio data 631 and pre-established language models. For example, the ASR component 650 may compare the input audio data 631 with models for sounds (e.g., acoustic units such as phonemes, senons, phones, etc.) and sequences of sounds to identify words that match the sequence of sounds of the speech represented in the input audio data 631. The ASR component 650 may the text data generated thereby to an NLU component 660, via, in some embodiments, the orchestrator component 630. The text data sent from the ASR component 650 to the NLU component 660 may include a single top-scoring ASR hypothesis or may include an N-best list including multiple top-scoring ASR hypotheses. An N-best list may additionally include a respective score associated with each ASR hypothesis represented therein. The ASR component 650 is described in additional detail below with reference to FIG. 7.

Figure 8:
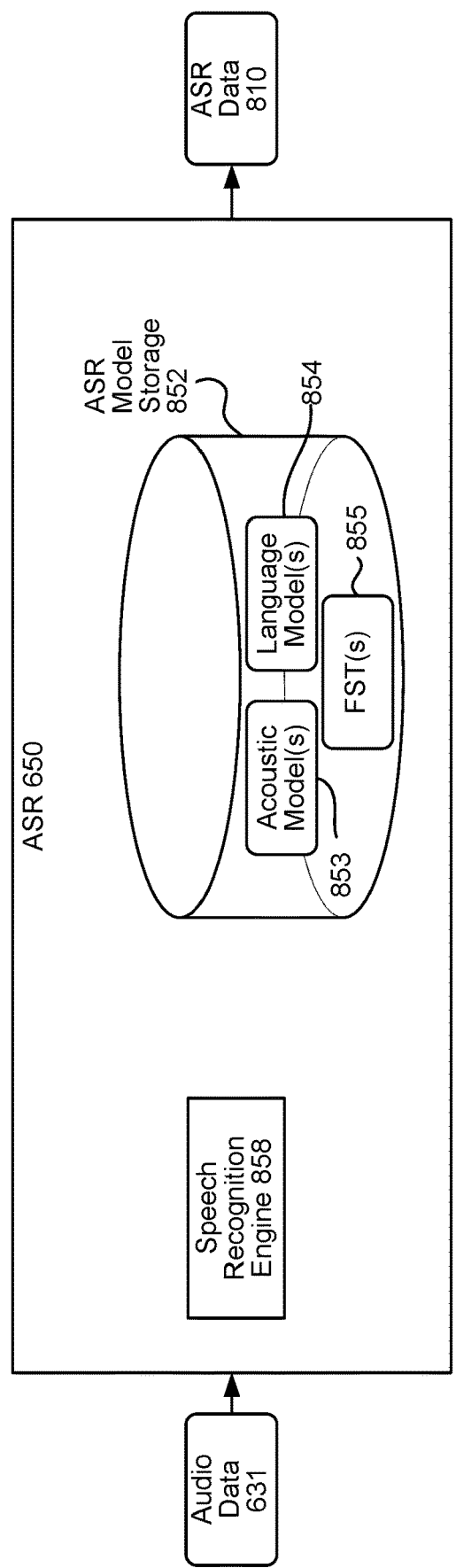
FIG. 8 is a conceptual diagram of an ASR component, according to embodiments of the present disclosure.
Figure 9:
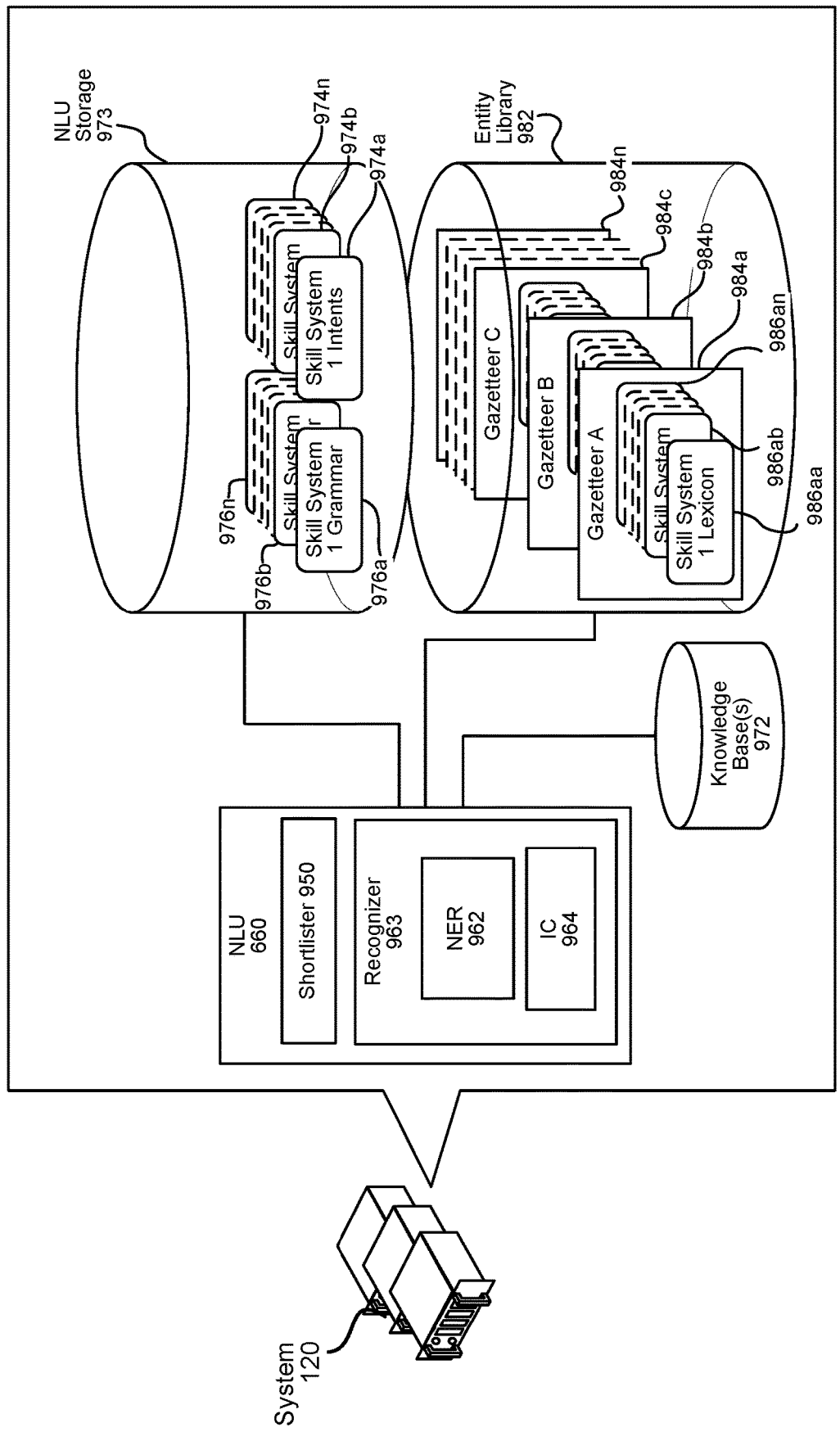
FIG. 9 is a conceptual diagram of how natural language processing is performed, according to embodiments of the present disclosure.

The language processing components 692 may further include a NLU component 660, which is shown in greater detail in FIGS. 8 and 9, that attempts to make a semantic interpretation of the phrase(s) or statement(s) represented in the text data input therein by determining one or more meanings associated with the phrase(s) or statement(s) represented in the text data. The NLU component 660 may determine an intent representing an action that a user desires be performed and may determine information that allows a device (e.g., the user device 110, the system(s) 120, a skill component 690, a skill system(s) 625, etc.) to execute the intent. For example, if the text data corresponds to "play Africa by Toto," the NLU component 660 may determine an intent that the system output music and may identify "Toto" as an artist and "Africa" as the song. For further example, if the text data corresponds to "what is the weather," the NLU component 660 may determine an intent that the system output weather information associated with a geographic location of the user device 110. In another example, if the text data corresponds to "turn off the lights," the NLU component 660 may determine an intent that the system turn off lights associated with the user device 110 or its user.

The NLU results data may be sent (via, for example, the orchestrator component 630) from the NLU component 660 (which may include tagged text data, indicators of intent, etc.) to a skill component(s) 690. If the NLU results data includes a single NLU hypothesis, the NLU component 660 may send the NLU results data to the skill component(s) 690 associated with the NLU hypothesis. If the NLU results data includes an N-best list of NLU hypotheses, the NLU component 660 may send the top scoring NLU hypothesis to a skill component(s) 690 associated with the top scoring NLU hypothesis. In some implementations, the NLU component 660 and/or skill component 690 may determine, using the interaction score, text data representing an indication of a handoff from one set of language processing components 692 to another (e.g., corresponding to a different virtual assistant profile).

A skill component 690 may be software running on or in conjunction with the system 600 that is, or is similar to, a software application. A skill component 690 may enable the system 600 to execute specific functionality in order to provide data or produce some other requested output. The system 600 may be configured with more than one skill component 690. For example, a weather service skill component may enable the system 600 to provide weather information, a car service skill component may enable the system 600 to book a trip with respect to a taxi or ride sharing service, a restaurant skill component may enable the system 600 to order a pizza with respect to the restaurant's online ordering system, etc. A skill component 690 may operate in conjunction between the system(s) 120 and other devices, such as the user device 110, in order to complete certain functions. Inputs to a skill component 690 may come from speech processing interactions or through other interactions or input sources. A skill component 690 may include hardware, software, firmware, or the like that may be dedicated to a particular skill component 690 or shared among different skill components 690.

Skill support system(s) 625 may communicate with a skill component(s) 690 within the system(s) 120 directly and/or via the orchestrator component 630. A skill support system(s) 625 may be configured to perform one or more actions. A skill may enable a skill support system(s) 625 to execute specific functionality in order to provide data or perform some other action requested by a user. For example, a weather service skill may enable a skill support system(s) 625 to provide weather information to the system(s) 120, a car service skill may enable a skill support system(s) 625 to book a trip with respect to a taxi or ride sharing service, an order pizza skill may enable a skill support system(s) 625 to order a pizza with respect to a restaurant's online ordering system, an AED skill component 690b may re-configure AED components, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill. The system 600 may include a skill component 690 dedicated to interacting with the skill support system(s) 625. A skill, skill device, or skill component may include a skill component 690 operated by the system 600 and/or skill operated by the skill support system(s) 625.

Figure 7:
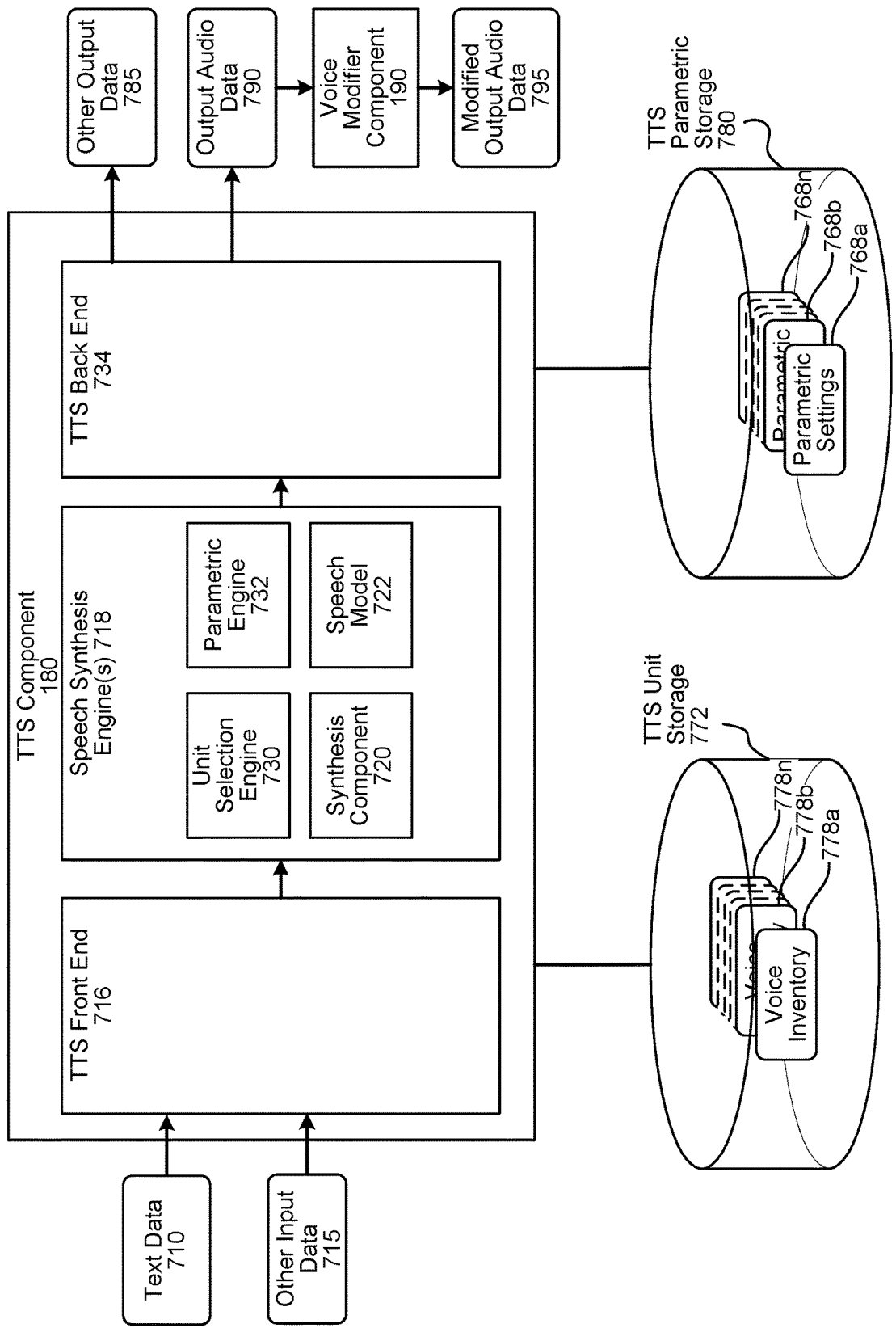
FIG. 7 is a conceptual diagram of text-to-speech components according to embodiments of the present disclosure.

The system 600 may include language output components 693 including a natural language generation component 679 and/or a TTS component 180, which was introduced in FIG. 1 and shown in greater detail in FIG. 7. The TTS component 180 may generate audio data (e.g., synthesized speech) from text data using one or more different methods. Text data input to the TTS component 180 may come from a skill component 690, the orchestrator component 630, and/or another component of the system. The text data may include an indication of a speech-processing component and/or data responsive to a command. The TTS component 180 may include or interface with the speech feature extractor component 160, voice modifier component 190, and/or the vocoder component 195 as described herein to provide synthesized speech having voice characteristics of a certain speaker (e.g., either real or simulated).

The system 600 may include profile storage 670. The profile storage 670 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information. The profile storage 670 may include one or more user profiles, with each user profile being associated with a different user identifier. Each user profile may include various user identifying information. Each user profile may also include preferences of the user and/or one or more device identifiers, representing one or more devices of the user. When a user logs into to, for example, an application installed on the device 110, the user profile (associated with the presented login information) may be updated to include information about the device 110. As described, the profile storage 670 may further include data that shows an interaction history of a user, including commands and times of receipt of commands. The profile storage 670 may further include data that shows when a second user was present to hear an indication of a handoff for a command uttered by a first user.

The profile storage 670 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 670 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system 600 may include a voice profile storage 675. The voice profile storage 675 may include a variety of information related to one or more target voices reproducible by the voice synthesis system 100. A "voice profile" may refer to a set of data associated with a target voice, either representing a particular human speaker or wholly synthetic. The voice profile data may include the speaker embedding data 166, the frequency data 168, and/or target voice-specific parameters of the voice modifier component 190. In some implementations, the voice profile data may include additional information about a target voice and/or target speaker such as data regarding prosody, accent, voice energy, speaking style, and/or speaker type (e.g., sex, age, etc.). A voice profile may include a voice identifier that a user and/or component of the system 600 may use to access a particular target voice for reproduction. Thus, a skill component 690 may receive an instruction to generate a message in a certain individual's voice, and use the voice identifier to request TTS conversion of text data in the specified target voice. Upon receiving text for conversion into speech, the voice synthesis system 100 may retrieve the identified voice profile from the voice profile storage 675, and use the retrieved voice characteristic data, voice modifier component 190 parameter data, etc., to generate synthetic speech that imitates characteristics of the target voice.

Figure 11:
FIG. 11 is a schematic diagram of an illustrative architecture in which sensor data is combined to recognize one or more users according to embodiments of the present disclosure.

The system 600 may include a user recognition component 695 that recognizes one or more users using a variety of data, as described in greater detail below with regard to FIGS. 11-12. The user recognition component 695 may take as input the audio data 631 and/or text data output by the ASR component 650. The user recognition component 695 may perform user recognition by comparing audio characteristics in the audio data 631 to stored audio characteristics of users. The user recognition component 695 may also perform user recognition by comparing biometric data (e.g., fingerprint data, iris data, etc.), received by the system in correlation with the present user input, to stored biometric data of users assuming user permission and previous authorization. The user recognition component 695 may further perform user recognition by comparing image data (e.g., including a representation of at least a feature of a user), received by the system in correlation with the present user input, with stored image data including representations of features of different users. The user recognition component 695 may perform additional user recognition processes, including those known in the art.

The user recognition component 695 determines scores indicating whether user input originated from a particular user. For example, a first score may indicate a likelihood that the user input originated from a first user, a second score may indicate a likelihood that the user input originated from a second user, etc. The user recognition component 695 also determines an overall confidence regarding the accuracy of user recognition operations.

Output of the user recognition component 695 may include a single user identifier corresponding to the most likely user that originated the user input. Alternatively, output of the user recognition component 695 may include an N-best list of user identifiers with respective scores indicating likelihoods of respective users originating the user input. The output of the user recognition component 695 may be used to inform NLU processing as well as processing performed by other components of the system.

The system 600 may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 7 is a conceptual diagram of an example TTS component 180 according to embodiments of the present disclosure. TTS component 180 may be used in the voice synthesis system 100. The TTS component 180 may receive text data 710 (e.g., text data received from a skill component 690 or the NLG component 679 and/or transcript data corresponding to the voice dataset 112, the multi-speaker dataset 114, and/or the target voice dataset 116) and generate output data 790 (e.g., synthesized spectrogram data 182) representing synthesized speech. The voice modifier component 190 may receive the output audio data 790 and modify it to generate modified output audio data 795 (e.g., modified spectrogram data 184) having voice characteristics different from the intrinsic voice(s) of the TTS component 180 and/or approximating a desired target voice, such as a celebrity or particular user of the system 600. The modified output audio data 795 may be sent to the vocoder component 195 (as shown in FIGS. 1 and 3) for conversion into audio waveform data suitable for amplification and output as an audible signal. Various models, inventories, and/or parametric settings of the TTS component 180 may be trained using the techniques previously discussed to output synthesized speech suitable for modification by the voice modifier component 190.

As shown in FIG. 7, the TTS component 180 may include a TTS front end 716, a speech synthesis engine 718, TTS unit storage 772, TTS parametric storage 780, and a TTS back end 734. The TTS unit storage 772 may include, among other things, voice inventories 778a-778n that may include pre-recorded audio segments (called units) to be used by the unit selection engine 730 when performing unit selection synthesis as described below. The TTS parametric storage 780 may include, among other things, parametric settings 768a-768n that may be used by the parametric synthesis engine 732 when performing parametric synthesis as described below. A particular set of parametric settings 768 may correspond to a particular voice profile (e.g., whispered speech, excited speech, etc.).

In various embodiments of the present disclosure, model-based synthesis of audio data may be performed using by a speech model 722 and a TTS front end 716. The TTS front end 716 may be the same as front ends used in traditional unit selection or parametric systems. In other embodiments, some or all of the components of the TTS front end 716 are based on other trained models. The present disclosure is not, however, limited to any particular type of TTS front end 716. The speech model 722 may be used to synthesize speech without requiring the TTS unit storage 772 or the TTS parametric storage 780, as described in greater detail below.

TTS component receives text data 710. Although the text data 710 in FIG. 7 is input into the TTS component 180, it may be output by other component(s) (such as a skill 690, NLU component 660, NLG component 679 or other component) and may be intended for output by the system. Thus in certain instances text data 710 may be referred to as "output text data." Further, the data 710 may not necessarily be text, but may include other data (such as symbols, code, other data, etc.) that may reference text (such as an indicator of a word) that is to be synthesized. Thus data 710 may come in a variety of forms. The TTS front end 716 transforms the data 710 (from, for example, an application, user, device, or other data source) into a symbolic linguistic representation, which may include linguistic context features such as phoneme data, punctuation data, syllable-level features, word-level features, and/or emotion, speaker, accent, or other features for processing by the speech synthesis engine 718. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 710, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 716 may also process other input data 715, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 710 and/or the text for a TTS request may be accompanied by separate metadata indicating what text should be whispered (or have some other indicated audio characteristic). The speech synthesis engine 718 may compare the annotated phonetic units models and information stored in the TTS unit storage 772 and/or TTS parametric storage 780 for converting the input text into speech. The TTS front end 716 and speech synthesis engine 718 may include their own controller(s)/processor(s) and memory or they may use the controller/processor and memory of the server 120, device 110, or other device, for example. Similarly, the instructions for operating the TTS front end 716 and speech synthesis engine 718 may be located within the TTS component 180, within the memory and/or storage of the server 120, device 110, or within an external device.

Text data 710 input into the TTS component 180 may be sent to the TTS front end 716 for processing. The front end 716 may include components for performing text normalization, linguistic analysis, linguistic prosody generation, or other such components. During text normalization, the TTS front end 716 may first process the text input and generate standard text, converting such things as numbers, abbreviations (such as Apt., St., etc.), symbols ($, %, etc.) into the equivalent of written out words.

During linguistic analysis, the TTS front end 716 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 180 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS unit storage 772. The linguistic analysis performed by the TTS front end 716 may also identify different grammatical components such as prefixes, suffixes, phrases, punctuation, syntactic boundaries, or the like. Such grammatical components may be used by the TTS component 180 to craft a natural-sounding audio waveform output. The language dictionary may also include letter-to-sound rules and other tools that may be used to pronounce previously unidentified words or letter combinations that may be encountered by the TTS component 180. Generally, the more information included in the language dictionary, the higher quality the speech output.

Based on the linguistic analysis the TTS front end 716 may then perform linguistic prosody generation where the phonetic units are annotated with desired prosodic characteristics, also called acoustic features, which indicate how the desired phonetic units are to be pronounced in the eventual output speech. During this stage the TTS front end 716 may consider and incorporate any prosodic annotations that accompanied the text input to the TTS component 180. Such acoustic features may include syllable-level features, word-level features, emotion, speaker, accent, language, pitch, energy, duration, and the like. Application of acoustic features may be based on prosodic models available to the TTS component 180. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 716, which may be referred to as a symbolic linguistic representation, may include a sequence of phonetic units annotated with prosodic characteristics. This symbolic linguistic representation may be sent to the speech synthesis engine 718, which may also be known as a synthesizer, for conversion into an audio waveform of speech for output to an audio output device and eventually to a user. The speech synthesis engine 718 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 718 may perform speech synthesis using one or more different methods. In one method of synthesis called unit selection, described further below, a unit selection engine 730 matches the symbolic linguistic representation created by the TTS front end 716 against a database of recorded speech, such as a database (e.g., TTS unit storage 772) storing information regarding one or more voice datasets (e.g., in the voice inventories 778a-n). Each voice inventory may correspond to various segments of audio that was recorded by a speaking human, such as a voice actor, where the segments are stored in an individual inventory 778 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 730 may then use the information about each unit to select units to be joined together to form the speech output.

The unit selection engine 730 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 720) to form output audio data 790 (e.g., a predicted spectrogram such as the synthesized spectrogram data 182) representing synthesized speech. Using all the information in the unit database, a unit selection engine 730 may match units to the input text to select units that can form a natural sounding waveform. One benefit of unit selection is that, depending on the size of the database, a natural sounding speech output may be generated. As described above, the larger the unit database of the voice dataset, the more likely the system will be able to construct natural sounding speech.

In another method of synthesis—called parametric synthesis—parameters such as frequency, volume, noise, are varied by a parametric synthesis engine 732, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 720) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 180 may be configured to perform TTS processing in multiple languages. For each language, the TTS component 180 may include specially configured data, instructions and/or components to synthesize speech in the desired language(s). To improve performance, the TTS component 180 may revise/update the contents of the TTS unit storage 772 based on feedback of the results of TTS processing, thus enabling the TTS component 180 to improve speech synthesis.

The TTS unit storage 772 may be customized for an individual user based on his/her individualized desired speech output. In particular, the speech unit stored in a unit database may be taken from input audio data of the user speaking. For example, to create the customized speech output of the system, the system may be configured with multiple voice inventories 778a-778n, where each unit database is configured with a different "voice" to match desired speech qualities. Such voice inventories may also be linked to user accounts. The voice selected by the TTS component 180 may be used to synthesize the speech. For example, one voice dataset may be stored to be used to synthesize whispered speech (or speech approximating whispered speech), another may be stored to be used to synthesize excited speech (or speech approximating excited speech), and so on. To create the different voice datasets a multitude of TTS training utterances may be spoken by an individual (such as a voice actor) and recorded by the system. The audio associated with the TTS training utterances may then be split into small audio segments and stored as part of a voice dataset. The individual speaking the TTS training utterances may speak in different voice qualities to create the customized voice datasets, for example the individual may whisper the training utterances, say them in an excited voice, and so on. Thus the audio of each customized voice dataset may match the respective desired speech quality. The customized voice inventory 778 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 768) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 730 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 730. As part of unit selection, the unit selection engine 730 chooses the speech unit with the lowest overall combined cost. For example, a speech unit with a very low target cost may not necessarily be selected if its join cost is high.

The system may be configured with one or more voice datasets for unit selection. Each voice dataset may include a speech unit database. The speech unit database may be stored in TTS unit storage 772 or in another storage component. For example, different unit selection databases may be stored in TTS unit storage 772. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 718 may attempt to select a unit in the speech unit database that most closely matches the input text (including both phonetic units and prosodic annotations). Generally the larger the voice dataset/speech unit database the better the speech synthesis may be achieved by virtue of the greater number of unit samples that may be selected to form the precise desired speech output.

Vocoder-based parametric speech synthesis may be performed as follows. A TTS component 180 may include an acoustic model, or other models, which may convert a symbolic linguistic representation into a synthetic acoustic waveform of the text input based on audio signal manipulation. The acoustic model includes rules which may be used by the parametric synthesis engine 732 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 716.

The parametric synthesis engine 732 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 718, the state may change or stay the same, based on the processing of the new text. For example, the pronunciation of a previously processed word might change based on later processed words. A Viterbi algorithm may be used to find the most likely sequence of states based on the processed text. The HMIs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 732 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 732 may lead to a number of potential audio output sequences. Based on the acoustic model and other potential models, the potential audio output sequences may be scored according to a confidence level of the parametric synthesis engine 732. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 768, which may represent acoustic settings matching a particular parametric "voice", may be used by the synthesis component 720 to ultimately create the output audio data 790.

When performing unit selection, after a unit is selected by the unit selection engine 730, the audio data corresponding to the unit may be passed to the synthesis component 720. The synthesis component 720 may then process the audio data of the unit to create modified audio data where the modified audio data reflects a desired audio quality. The synthesis component 720 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS component 180. For each unit that corresponds to the selected portion, the synthesis component 720 may process the audio data for that unit to create a modified unit audio data. The modified unit audio data may then be concatenated to form the output audio data 790. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS component 180. In that case, other output data 785 may be output along with the output audio data 790 so that an ultimate playback device (e.g., device 110) receives instructions for playback that can assist in creating the desired output audio. Thus, the other output data 785 may include instructions or other data indicating playback device settings (such as volume, playback rate, etc.) or other data indicating how output audio data including synthesized speech should be output. For example, for whispered speech, the output audio data 790 may include other output data 785 that may include a prosody tag or other indicator that instructs the device 110 to slow down the playback of the output audio data 790, thus making the ultimate audio sound more like whispered speech, which is typically slower than normal speech. In another example, the other output data 785 may include a volume tag that instructs the device 110 to output the speech at a volume level less than a current volume setting of the device 110, thus improving the quiet whisper effect.

FIG. 8 is a conceptual diagram of an ASR component 650, according to embodiments of the present disclosure. The ASR component 650 may interpret a spoken natural language input based on the similarity between the spoken natural language input and pre-established language models 854 stored in an ASR model storage 852. For example, the ASR component 650 may compare the audio data with models for sounds (e.g., subword units or phonemes) and sequences of sounds to identify words that match the sequence of sounds spoken in the natural language input. Alternatively, the ASR component 650 may use a finite state transducer (FST) 855 to implement the language model functions. In some cases, the ASR component 650 may generate transcripts of recorded speech in one or more of the voice dataset 112, the multi-speaker dataset 114, and/or the target voice dataset 116 in the event that the dataset does not include a transcript and/or was not generated based on the speaker(s) reading from a provided transcript.

When the ASR component 650 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 853 stored in the ASR model storage 852), and the likelihood that a particular word, which matches the sounds, would be included in the sentence at the specific location (e.g., using a language or grammar model 854). Based on the considered factors and the assigned confidence score, the ASR component 650 may output an ASR hypothesis that most likely matches the spoken natural language input, or may output multiple ASR hypotheses in the form of a lattice or an N-best list, with each ASR hypothesis corresponding to a respective score.

The ASR component 650 may include a speech recognition engine 858. The ASR component 650 receives audio data 631 (for example, received from a local device 110 having processed audio detected by a microphone by an acoustic front end (AFE) or other component). The speech recognition engine 858 compares the audio data 631 with acoustic models 853, language models 854, FST(s) 855, and/or other data models and information for recognizing the speech conveyed in the audio data. The audio data 631 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 858 may process the audio data 631 with reference to information stored in the ASR model storage 852. Feature vectors of the audio data 631 may arrive at the system 120 encoded, in which case they may be decoded prior to processing by the speech recognition engine 858.

The speech recognition engine 858 attempts to match received feature vectors to language acoustic units (e.g., phonemes) and words as known in the stored acoustic models 853, language models 854, and FST(s) 855. For example, audio data 631 may be processed by one or more acoustic model(s) 853 to determine acoustic unit data. The acoustic unit data may include indicators of acoustic units detected in the audio data 631 by the ASR component 650. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 854 (and/or using FST 855) to determine ASR data 810. The ASR data 810 can include one or more hypotheses. One or more of the hypotheses represented in the ASR data 810 may then be sent to further components (such as the NLU component 660) for further processing as discussed herein. The ASR data 810 may include representations of text of an utterance, such as words, subword units, or the like.

The speech recognition engine 858 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 650 will output ASR hypotheses that make sense grammatically. The specific models used may be general models or may be models corresponding to a particular domain, such as music, banking, etc.

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 858 may use the acoustic model(s) 853 to attempt to match received audio feature vectors to words or subword acoustic units. An acoustic unit may be a senone, phoneme, phoneme in context, syllable, part of a syllable, syllable in context, or any other such portion of a word. The speech recognition engine 858 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 650 outputs ASR hypotheses that make sense grammatically.

The speech recognition engine 858 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMI and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 858, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 858 may also compute scores of branches of the paths based on language models or grammars. Language modeling involves determining scores for what words are likely to be used together to form coherent words and sentences. Application of a language model may improve the likelihood that the ASR component 650 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 10:
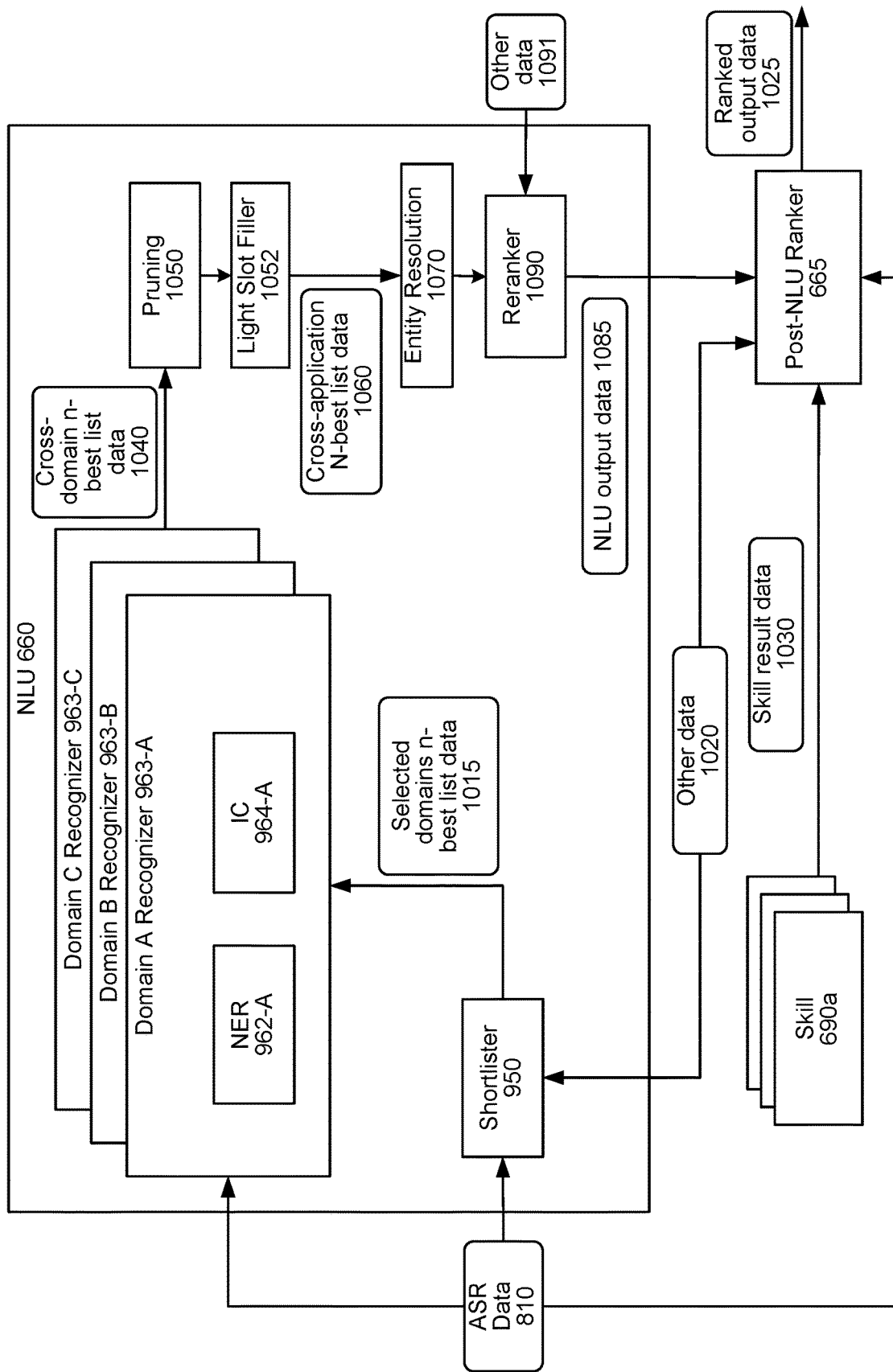
FIG. 10 is a conceptual diagram of how natural language processing is performed, according to embodiments of the present disclosure.

FIGS. 9 and 10 illustrates how the NLU component 660 may perform NLU processing. FIG. 9 is a conceptual diagram of how natural language processing is performed, according to embodiments of the present disclosure. And FIG. 10 is a conceptual diagram of how natural language processing is performed, according to embodiments of the present disclosure.

FIG. 9 illustrates how NLU processing is performed on text data. The NLU component 660 may process text data including several ASR hypotheses of a single user input. For example, if the ASR component 650 outputs text data including an n-best list of ASR hypotheses, the NLU component 660 may process the text data with respect to all (or a portion of) the ASR hypotheses represented therein.

The NLU component 660 may annotate text data by parsing and/or tagging the text data. For example, for the text data "tell me the weather for Seattle," the NLU component 660 may tag "tell me the weather for Seattle" as an <OutputWeather> intent as well as separately tag "Seattle" as a location for the weather information.

The NLU component 660 may include a shortlister component 950. The shortlister component 950 selects skills that may execute with respect to ASR output data 810 input to the NLU component 660 (e.g., applications that may execute with respect to the user input). The ASR output data 810 (which may also be referred to as ASR data 810) may include representations of text of an utterance, such as words, subword units, or the like. The shortlister component 950 thus limits downstream, more resource intensive NLU processes to being performed with respect to skills that may execute with respect to the user input.

Without a shortlister component 950, the NLU component 660 may process ASR output data 810 input thereto with respect to every skill of the system, either in parallel, in series, or using some combination thereof. By implementing a shortlister component 950, the NLU component 660 may process ASR output data 810 with respect to only the skills that may execute with respect to the user input. This reduces total compute power and latency attributed to NLU processing.

The shortlister component 950 may include one or more trained models. The model(s) may be trained to recognize various forms of user inputs that may be received by the system(s) 120. For example, during a training period skill system(s) 625 associated with a skill may provide the system(s) 120 with training text data representing sample user inputs that may be provided by a user to invoke the skill. For example, for a ride sharing skill, a skill system(s) 625 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 950 may be trained, using the training text data representing sample user inputs, to determine other potentially related user input structures that users may try to use to invoke the particular skill. During training, the system(s) 120 may solicit the skill system(s) 625 associated with the skill regarding whether the determined other user input structures are permissible, from the perspective of the skill system(s) 625, to be used to invoke the skill. The alternate user input structures may be derived by one or more trained models during model training and/or may be based on user input structures provided by different skills. The skill system(s) 625 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 950 may be trained with respect to a different skill. Alternatively, the shortlister component 950 may use one trained model per domain, such as one trained model for skills associated with a weather domain, one trained model for skills associated with a ride sharing domain, etc.

The system(s) 120 may use the sample user inputs provided by a skill system(s) 625, and related sample user inputs potentially determined during training, as binary examples to train a model associated with a skill associated with the skill system(s) 625. The model associated with the particular skill may then be operated at runtime by the shortlister component 950. For example, some sample user inputs may be positive examples (e.g., user inputs that may be used to invoke the skill). Other sample user inputs may be negative examples (e.g., user inputs that may not be used to invoke the skill).

As described above, the shortlister component 950 may include a different trained model for each skill of the system, a different trained model for each domain, or some other combination of trained model(s). For example, the shortlister component 950 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 950 to output indications of only a portion of the skills that the ASR output data 810 may relate to. For example, a user input may correspond to "tell me about Tom Collins." If the model is clustered based on domain, the shortlister component 950 may determine the user input corresponds to a recipe skill (e.g., a drink recipe) even though the user input may also correspond to an information skill (e.g., including information about a person named Tom Collins).

The NLU component 660 may include one or more recognizers 963. In at least some embodiments, a recognizer 963 may be associated with a skill system 625 (e.g., the recognizer may be configured to interpret text data to correspond to the skill system 625). In at least some other examples, a recognizer 963 may be associated with a domain such as smart home, video, music, weather, custom, etc. (e.g., the recognizer may be configured to interpret text data to correspond to the domain).

If the shortlister component 950 determines ASR output data 810 is potentially associated with multiple domains, the recognizers 963 associated with the domains may process the ASR output data 810, while recognizers 963 not indicated in the shortlister component 950's output may not process the ASR output data 810. The "shortlisted" recognizers 963 may process the ASR output data 810 in parallel, in series, partially in parallel, etc. For example, if ASR output data 810 potentially relates to both a communications domain and a music domain, a recognizer associated with the communications domain may process the ASR output data 810 in parallel, or partially in parallel, with a recognizer associated with the music domain processing the ASR output data 810.

Each recognizer 963 may include a named entity recognition (NER) component 962. The NER component 962 attempts to identify grammars and lexical information that may be used to construe meaning with respect to text data input therein. The NER component 962 identifies portions of text data that correspond to a named entity associated with a domain, associated with the recognizer 963 implementing the NER component 962. The NER component 962 (or other component of the NLU component 660) may also determine whether a word refers to an entity whose identity is not explicitly mentioned in the text data, for example "him," "her," "it" or other anaphora, exophora, or the like.

Each recognizer 963, and more specifically each NER component 962, may be associated with a particular grammar database 976, a particular set of intents/actions 974, and a particular personalized lexicon 986. The grammar databases 976, and intents/actions 974 may be stored in an NLU storage 973. Each gazetteer 984 may include domain/skill-indexed lexical information associated with a particular user and/or device 110. For example, a Gazetteer A (984*a*) includes skill-indexed lexical information 986*aa* to 986*an*. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 962 applies grammar information 976 and lexical information 986 associated with a domain (associated with the recognizer 963 implementing the NER component 962) to determine a mention of one or more entities in text data. In this manner, the NER component 962 identifies "slots" (each corresponding to one or more particular words in text data) that may be useful for later processing. The NER component 962 may also label each slot with a type (e.g., noun, place, city, artist name, song name, etc.).

Each grammar database 976 includes the names of entities (i.e., nouns) commonly found in speech about the particular domain to which the grammar database 976 relates, whereas the lexical information 986 is personalized to the user and/or the device 110 from which the user input originated. For example, a grammar database 976 associated with a shopping domain may include a database of words commonly used when people discuss shopping.

A downstream process called entity resolution (discussed in detail elsewhere herein) links a slot of text data to a specific entity known to the system. To perform entity resolution, the NLU component 660 may utilize gazetteer information (984a-984n) stored in an entity library storage 982. The gazetteer information 984 may be used to match text data (representing a portion of the user input) with text data representing known entities, such as song titles, contact names, etc. Gazetteers 984 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 963 may also include an intent classification (IC) component 964. An IC component 964 parses text data to determine an intent(s) (associated with the domain associated with the recognizer 963 implementing the IC component 964) that potentially represents the user input. An intent represents to an action a user desires be performed. An IC component 964 may communicate with a database 974 of words linked to intents. For example, a music intent database may link words and phrases such as "quiet," "volume off," and "mute" to a <Mute> intent. An IC component 964 identifies potential intents by comparing words and phrases in text data (representing at least a portion of the user input) to the words and phrases in an intents database 974 (associated with the domain that is associated with the recognizer 963 implementing the IC component 964).

The intents identifiable by a specific IC component 964 are linked to domain-specific (i.e., the domain associated with the recognizer 963 implementing the IC component 964) grammar frameworks 976 with "slots" to be filled. Each slot of a grammar framework 976 corresponds to a portion of text data that the system believes corresponds to an entity. For example, a grammar framework 976 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 976 may not be structured as sentences, but rather based on associating slots with grammatical tags.

For example, an NER component 962 may parse text data to identify words as subject, object, verb, preposition, etc. based on grammar rules and/or models prior to recognizing named entities in the text data. An IC component 964 (implemented by the same recognizer 963 as the NER component 962) may use the identified verb to identify an intent. The NER component 962 may then determine a grammar model 976 associated with the identified intent. For example, a grammar model 976 for an intent corresponding to <PlayMusic> may specify a list of slots applicable to play the identified "object" and any object modifier (e.g., a prepositional phrase), such as {Artist Name}, {Album Name}, {Song name}, etc. The NER component 962 may then search corresponding fields in a lexicon 986 (associated with the domain associated with the recognizer 963 implementing the NER component 962), attempting to match words and phrases in text data the NER component 962 previously tagged as a grammatical object or object modifier with those identified in the lexicon 986.

An NER component 962 may perform semantic tagging, which is the labeling of a word or combination of words according to their type/semantic meaning. An NER component 962 may parse text data using heuristic grammar rules, or a model may be constructed using techniques such as Hidden Markov Models, maximum entropy models, log linear models, conditional random fields (CRF), and the like.

For example, an NER component 962 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 962 identifies "Play" as a verb based on a word database associated with the music domain, which an IC component 964 (also implemented by the music domain recognizer) may determine corresponds to a <PlayMusic> intent. At this stage, no determination has been made as to the meaning of "mother's little helper" or "the rolling stones," but based on grammar rules and models, the NER component 962 has determined the text of these phrases relates to the grammatical object (i.e., entity) of the user input represented in the text data.

An NER component 962 may tag text data to attribute meaning thereto. For example, an NER component 962 may tag "play mother's little helper by the rolling stones" as: {domain} Music, {intent}<PlayMusic>, {artist name} rolling stones, {media type} SONG, and {song title} mother's little helper. For further example, the NER component 962 may tag "play songs by the rolling stones" as: {domain} Music, {intent}<PlayMusic>, {artist name} rolling stones, and {media type} SONG.

The shortlister component 950 may receive ASR output data 810 output from the ASR component 650 or output from the device 110b (as illustrated in FIG. 10). The ASR component 650 may embed the ASR output data 810 into a form processable by a trained model(s) using sentence embedding techniques as known in the art. Sentence embedding results in the ASR output data 810 including text in a structure that enables the trained models of the shortlister component 950 to operate on the ASR output data 810. For example, an embedding of the ASR output data 810 may be a vector representation of the ASR output data 810.

The shortlister component 950 may make binary determinations (e.g., yes or no) regarding which domains relate to the ASR output data 810. The shortlister component 950 may make such determinations using the one or more trained models described herein above. If the shortlister component 950 implements a single trained model for each domain, the shortlister component 950 may simply run the models that are associated with enabled domains as indicated in a user profile associated with the device 110 and/or user that originated the user input.

The shortlister component 950 may generate n-best list data 1015 representing domains that may execute with respect to the user input represented in the ASR output data 810. The size of the n-best list represented in the n-best list data 1015 is configurable. In an example, the n-best list data 1015 may indicate every domain of the system as well as contain an indication, for each domain, regarding whether the domain is likely capable to execute the user input represented in the ASR output data 810. In another example, instead of indicating every domain of the system, the n-best list data 1015 may only indicate the domains that are likely to be able to execute the user input represented in the ASR output data 810. In yet another example, the shortlister component 950 may implement thresholding such that the n-best list data 1015 may indicate no more than a maximum number of domains that may execute the user input represented in the ASR output data 810. In an example, the threshold number of domains that may be represented in the n-best list data 1015 is ten. In another example, the domains included in the n-best list data 1015 may be limited by a threshold a score, where only domains indicating a likelihood to handle the user input is above a certain score (as determined by processing the ASR output data 810 by the shortlister component 950 relative to such domains) are included in the n-best list data 1015.

The ASR output data 810 may correspond to more than one ASR hypothesis. When this occurs, the shortlister component 950 may output a different n-best list (represented in the n-best list data 1015) for each ASR hypothesis. Alternatively, the shortlister component 950 may output a single n-best list representing the domains that are related to the multiple ASR hypotheses represented in the ASR output data 810.

As indicated above, the shortlister component 950 may implement thresholding such that an n-best list output therefrom may include no more than a threshold number of entries. If the ASR output data 810 includes more than one ASR hypothesis, the n-best list output by the shortlister component 950 may include no more than a threshold number of entries irrespective of the number of ASR hypotheses output by the ASR component 650. Alternatively or in addition, the n-best list output by the shortlister component 950 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 810, the shortlister component 950 may generate confidence scores representing likelihoods that domains relate to the ASR output data 810. If the shortlister component 950 implements a different trained model for each domain, the shortlister component 950 may generate a different confidence score for each individual domain trained model that is run. If the shortlister component 950 runs the models of every domain when ASR output data 810 is received, the shortlister component 950 may generate a different confidence score for each domain of the system. If the shortlister component 950 runs the models of only the domains that are associated with skills indicated as enabled in a user profile associated with the device 110 and/or user that originated the user input, the shortlister component 950 may only generate a different confidence score for each domain associated with at least one enabled skill. If the shortlister component 950 implements a single trained model with domain specifically trained portions, the shortlister component 950 may generate a different confidence score for each domain who's specifically trained portion is run. The shortlister component 950 may perform matrix vector modification to obtain confidence scores for all domains of the system in a single instance of processing of the ASR output data 810.

N-best list data 1015 including confidence scores that may be output by the shortlister component 950 may be represented as, for example:

Search domain, 0.67
Recipe domain, 0.62
Information domain, 0.57
Shopping domain, 0.42

As indicated, the confidence scores output by the shortlister component 950 may be numeric values. The confidence scores output by the shortlister component 950 may alternatively be binned values (e.g., high, medium, low).

The n-best list may only include entries for domains having a confidence score satisfying (e.g., equaling or exceeding) a minimum threshold confidence score. Alternatively, the shortlister component 950 may include entries for all domains associated with user enabled skills, even if one or more of the domains are associated with confidence scores that do not satisfy the minimum threshold confidence score.

The shortlister component 950 may consider other data 1020 when determining which domains may relate to the user input represented in the ASR output data 810 as well as respective confidence scores. The other data 1020 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 1020 may include an indicator of the user associated with the ASR output data 810, for example as determined by the user recognition component 695.

The other data 1020 may be character embedded prior to being input to the shortlister component 950. The other data 1020 may alternatively be embedded using other techniques known in the art prior to being input to the shortlister component 950.

The other data 1020 may also include data indicating the domains associated with skills that are enabled with respect to the device 110 and/or user that originated the user input. The shortlister component 950 may use such data to determine which domain-specific trained models to run. That is, the shortlister component 950 may determine to only run the trained models associated with domains that are associated with user-enabled skills. The shortlister component 950 may alternatively use such data to alter confidence scores of domains.

As an example, considering two domains, a first domain associated with at least one enabled skill and a second domain not associated with any user-enabled skills of the user that originated the user input, the shortlister component 950 may run a first model specific to the first domain as well as a second model specific to the second domain. Alternatively, the shortlister component 950 may run a model configured to determine a score for each of the first and second domains. The shortlister component 950 may determine a same confidence score for each of the first and second domains in the first instance. The shortlister component 950 may then alter those confidence scores based on which domains is associated with at least one skill enabled by the present user. For example, the shortlister component 950 may increase the confidence score associated with the domain associated with at least one enabled skill while leaving the confidence score associated with the other domain the same. Alternatively, the shortlister component 950 may leave the confidence score associated with the domain associated with at least one enabled skill the same while decreasing the confidence score associated with the other domain. Moreover, the shortlister component 950 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 670. When the shortlister component 950 receives the ASR output data 810, the shortlister component 950 may determine whether profile data associated with the user and/or device 110 that originated the command includes an indication of enabled skills.

The other data 1020 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 950 may use such data to determine which domain-specific trained models to run. For example, if the device 110 corresponds to a displayless type device, the shortlister component 950 may determine not to run trained models specific to domains that output video data. The shortlister component 950 may alternatively use such data to alter confidence scores of domains.

As an example, considering two domains, one that outputs audio data and another that outputs video data, the shortlister component 950 may run a first model specific to the domain that generates audio data as well as a second model specific to the domain that generates video data. Alternatively the shortlister component 950 may run a model configured to determine a score for each domain. The shortlister component 950 may determine a same confidence score for each of the domains in the first instance. The shortlister component 950 may then alter the original confidence scores based on the type of the device 110 that originated the user input corresponding to the ASR output data 810. For example, if the device 110 is a displayless device, the shortlister component 950 may increase the confidence score associated with the domain that generates audio data while leaving the confidence score associated with the domain that generates video data the same. Alternatively, if the device 110 is a displayless device, the shortlister component 950 may leave the confidence score associated with the domain that generates audio data the same while decreasing the confidence score associated with the domain that generates video data. Moreover, if the device 110 is a displayless device, the shortlister component 950 may increase the confidence score associated with the domain that generates audio data as well as decrease the confidence score associated with the domain that generates video data.

The type of device information represented in the other data 1020 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 1020 may represent the smart TV of other display device, and not the displayless device that captured the spoken user input.

The other data 1020 may also include data indicating the user input originating device's speed, location, or other mobility information. For example, the device may correspond to a vehicle including a display. If the vehicle is moving, the shortlister component 950 may decrease the confidence score associated with a domain that generates video data as it may be undesirable to output video content to a user while the user is driving. The device may output data to the system(s) 120 indicating when the device is moving.

The other data 1020 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 950 may use such data to alter confidence scores of domains. For example, the shortlister component 950 may run a first model specific to a first domain as well as a second model specific to a second domain. Alternatively, the shortlister component 950 may run a model configured to determine a score for each domain. The shortlister component 950 may also determine a same confidence score for each of the domains in the first instance. The shortlister component 950 may then alter the original confidence scores based on the first domain being invoked to cause the system to output content while the current user input was received. Based on the first domain being invoked, the shortlister component 950 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1015 generated by the shortlister component 950 as well as the different types of other data 1020 considered by the shortlister component 950 are configurable. For example, the shortlister component 950 may update confidence scores as more other data 1020 is considered. For further example, the n-best list data 1015 may exclude relevant domains if thresholding is implemented. Thus, for example, the shortlister component 950 may include an indication of a domain in the n-best list 1015 unless the shortlister component 950 is one hundred percent confident that the domain may not execute the user input represented in the ASR output data 810 (e.g., the shortlister component 950 determines a confidence score of zero for the domain).

The shortlister component 950 may send the ASR output data 810 to recognizers 963 associated with domains represented in the n-best list data 1015. Alternatively, the shortlister component 950 may send the n-best list data 1015 or some other indicator of the selected subset of domains to another component (such as the orchestrator component 630) which may in turn send the ASR output data 810 to the recognizers 963 corresponding to the domains included in the n-best list data 1015 or otherwise indicated in the indicator. If the shortlister component 950 generates an n-best list representing domains without any associated confidence scores, the shortlister component 950/orchestrator component 630 may send the ASR output data 810 to recognizers 963 associated with domains that the shortlister component 950 determines may execute the user input. If the shortlister component 950 generates an n-best list representing domains with associated confidence scores, the shortlister component 950/orchestrator component 630 may send the ASR output data 810 to recognizers 963 associated with domains associated with confidence scores satisfying (e.g., meeting or exceeding) a threshold minimum confidence score.

A recognizer 963 may output tagged text data generated by an NER component 962 and an IC component 964, as described herein above. The NLU component 660 may compile the output tagged text data of the recognizers 963 into a single cross-domain n-best list 1040 and may send the cross-domain n-best list 1040 to a pruning component 1050. Each entry of tagged text (e.g., each NLU hypothesis) represented in the cross-domain n-best list data 1040 may be associated with a respective score indicating a likelihood that the NLU hypothesis corresponds to the domain associated with the recognizer 963 from which the NLU hypothesis was output. For example, the cross-domain n-best list data 1040 may be represented as (with each line corresponding to a different NLU hypothesis):

[0.95] Intent: <PlayMusic> ArtistName: Beethoven SongName: Waldstein Sonata

[0.70] Intent: <PlayVideo> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 1050 may sort the NLU hypotheses represented in the cross-domain n-best list data 1040 according to their respective scores. The pruning component 1050 may perform score thresholding with respect to the cross-domain NLU hypotheses. For example, the pruning component 1050 may select NLU hypotheses associated with scores satisfying (e.g., meeting and/or exceeding) a threshold score. The pruning component 1050 may also or alternatively perform number of NLU hypothesis thresholding. For example, the pruning component 1050 may select the top scoring NLU hypothesis(es). The pruning component 1050 may output a portion of the NLU hypotheses input thereto. The purpose of the pruning component 1050 is to create a reduced list of NLU hypotheses so that downstream, more resource intensive, processes may only operate on the NLU hypotheses that most likely represent the user's intent.

The NLU component 660 may include a light slot filler component 1052. The light slot filler component 1052 can take text from slots represented in the NLU hypotheses output by the pruning component 1050 and alter them to make the text more easily processed by downstream components. The light slot filler component 1052 may perform low latency operations that do not involve heavy operations such as reference to a knowledge base (e.g., 972. The purpose of the light slot filler component 1052 is to replace words with other words or values that may be more easily understood by downstream components. For example, if a NLU hypothesis includes the word "tomorrow," the light slot filler component 1052 may replace the word "tomorrow" with an actual date for purposes of downstream processing. Similarly, the light slot filler component 1052 may replace the word "CD" with "album" or the words "compact disc." The replaced words are then included in the cross-domain n-best list data 1060.

The cross-domain n-best list data 1060 may be input to an entity resolution component 1070. The entity resolution component 1070 can apply rules or other instructions to standardize labels or tokens from previous stages into an intent/slot representation. The precise transformation may depend on the domain. For example, for a travel domain, the entity resolution component 1070 may transform text corresponding to "Boston airport" to the standard BOS three-letter code referring to the airport. The entity resolution component 1070 can refer to a knowledge base (e.g., 972) that is used to specifically identify the precise entity referred to in each slot of each NLU hypothesis represented in the cross-domain n-best list data 1060. Specific intent/slot combinations may also be tied to a particular source, which may then be used to resolve the text. In the example "play songs by the stones," the entity resolution component 1070 may reference a personal music catalog, Amazon Music account, a user profile, or the like. The entity resolution component 1070 may output an altered n-best list that is based on the cross-domain n-best list 1060 but that includes more detailed information (e.g., entity IDs) about the specific entities mentioned in the slots and/or more detailed slot data that can eventually be used by a skill. The NLU component 660 may include multiple entity resolution components 1070 and each entity resolution component 1070 may be specific to one or more domains.

The NLU component 660 may include a reranker 1090. The reranker 1090 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1070.

The reranker 1090 may apply re-scoring, biasing, or other techniques. The reranker 1090 may consider not only the data output by the entity resolution component 1070, but may also consider other data 1091. The other data 1091 may include a variety of information. For example, the other data 1091 may include skill rating or popularity data. For example, if one skill has a high rating, the reranker 1090 may increase the score of a NLU hypothesis that may be processed by the skill. The other data 1091 may also include information about skills that have been enabled by the user that originated the user input. For example, the reranker 1090 may assign higher scores to NLU hypothesis that may be processed by enabled skills than NLU hypothesis that may be processed by non-enabled skills. The other data 1091 may also include data indicating user usage history, such as if the user that originated the user input regularly uses a particular skill or does so at particular times of day. The other data 1091 may additionally include data indicating date, time, location, weather, type of device 110, user identifier, context, as well as other information. For example, the reranker 1090 may consider when any particular skill is currently active (e.g., music being played, a game being played, etc.).

As illustrated and described, the entity resolution component 1070 is implemented prior to the reranker 1090. The entity resolution component 1070 may alternatively be implemented after the reranker 1090. Implementing the entity resolution component 1070 after the reranker 1090 limits the NLU hypotheses processed by the entity resolution component 1070 to only those hypotheses that successfully pass through the reranker 1090.

The reranker 1090 may be a global reranker (e.g., one that is not specific to any particular domain). Alternatively, the NLU component 660 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 660 may perform NLU processing described above with respect to domains associated with skills wholly implemented as part of the system(s) 120 (e.g., designated 690 in FIG. 6). The NLU component 660 may separately perform NLU processing described above with respect to domains associated with skills that are at least partially implemented as part of the skill system(s) 625. In an example, the shortlister component 950 may only process with respect to these latter domains. Results of these two NLU processing paths may be merged into NLU output data 1085, which may be sent to a post-NLU ranker 665, which may be implemented by the system(s) 120.

The post-NLU ranker 665 may include a statistical component that produces a ranked list of intent/skill pairs with associated confidence scores. Each confidence score may indicate an adequacy of the skill's execution of the intent with respect to NLU results data associated with the skill. The post-NLU ranker 665 may operate one or more trained models configured to process the NLU results data 1085, skill result data 1030, and the other data 1020 in order to output ranked output data 1025. The ranked output data 1025 may include an n-best list where the NLU hypotheses in the NLU results data 1085 are reordered such that the n-best list in the ranked output data 1025 represents a prioritized list of skills to respond to a user input as determined by the post-NLU ranker 665. The ranked output data 1025 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 665 enables the system to better determine the best skill to execute the user input. For example, first and second NLU hypotheses in the NLU results data 1085 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 665 (or other scheduling component such as orchestrator component 630) may solicit the first skill and the second skill to provide potential result data 1030 based on the first NLU hypothesis and the second NLU hypothesis, respectively. For example, the post-NLU ranker 665 may send the first NLU hypothesis to the first skill 690a along with a request for the first skill 690a to at least partially execute with respect to the first NLU hypothesis. The post-NLU ranker 665 may also send the second NLU hypothesis to the second skill 690b along with a request for the second skill 690b to at least partially execute with respect to the second NLU hypothesis. The post-NLU ranker 665 receives, from the first skill 690a, first result data 1030a generated from the first skill 690a's execution with respect to the first NLU hypothesis. The post-NLU ranker 665 also receives, from the second skill 690b, second results data 1030b generated from the second skill 690b's execution with respect to the second NLU hypothesis.

The result data 1030 may include various portions. For example, the result data 1030 may include content (e.g., audio data, text data, and/or video data) to be output to a user. The result data 1030 may also include a unique identifier used by the system(s) 120 and/or the skill system(s) 625 to locate the data to be output to a user. The result data 1030 may also include an instruction. For example, if the user input corresponds to "turn on the light," the result data 1030 may include an instruction causing the system to turn on a light associated with a profile of the device (110a/110b) and/or user.

The post-NLU ranker 665 may consider the first result data 1030a and the second result data 1030b to alter the first confidence score and the second confidence score of the first NLU hypothesis and the second NLU hypothesis, respectively. That is, the post-NLU ranker 665 may generate a third confidence score based on the first result data 1030a and the first confidence score. The third confidence score may correspond to how likely the post-NLU ranker 665 determines the first skill will correctly respond to the user input. The post-NLU ranker 665 may also generate a fourth confidence score based on the second result data 1030b and the second confidence score. One skilled in the art will appreciate that a first difference between the third confidence score and the fourth confidence score may be greater than a second difference between the first confidence score and the second confidence score. The post-NLU ranker 665 may also consider the other data 1020 to generate the third confidence score and the fourth confidence score. While it has been described that the post-NLU ranker 665 may alter the confidence scores associated with first and second NLU hypotheses, one skilled in the art will appreciate that the post-NLU ranker 665 may alter the confidence scores of more than two NLU hypotheses. The post-NLU ranker 665 may select the result data 1030 associated with the skill 690 with the highest altered confidence score to be the data output in response to the current user input. The post-NLU ranker 665 may also consider the ASR output data 810 to alter the NLU hypotheses confidence scores.

The orchestrator component 630 may, prior to sending the NLU results data 1085 to the post-NLU ranker 665, associate intents in the NLU hypotheses with skills 690. For example, if a NLU hypothesis includes a <PlayMusic> intent, the orchestrator component 630 may associate the NLU hypothesis with one or more skills 690 that can execute the <PlayMusic> intent. Thus, the orchestrator component 630 may send the NLU results data 1085, including NLU hypotheses paired with skills 690, to the post-NLU ranker 665. In response to ASR output data 810 corresponding to "what should I do for dinner today," the orchestrator component 630 may generates pairs of skills 690 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 665 queries each skill 690, paired with a NLU hypothesis in the NLU output data 1085, to provide result data 1030 based on the NLU hypothesis with which it is associated. That is, with respect to each skill, the post-NLU ranker 665 colloquially asks the each skill "if given this NLU hypothesis, what would you do with it." According to the above example, the post-NLU ranker 665 may send skills 690 the following data:

Skill 1: First NLU hypothesis including <Help> intent indicator
Skill 2: Second NLU hypothesis including <Order> intent indicator
Skill 3: Third NLU hypothesis including <DishType> intent indicator The post-NLU ranker 665 may query each of the skills 690 in parallel or substantially in parallel.

A skill 690 may provide the post-NLU ranker 665 with various data and indications in response to the post-NLU ranker 665 soliciting the skill 690 for result data 1030. A skill 690 may simply provide the post-NLU ranker 665 with an indication of whether or not the skill can execute with respect to the NLU hypothesis it received. A skill 690 may also or alternatively provide the post-NLU ranker 665 with output data generated based on the NLU hypothesis it received. In some situations, a skill 690 may need further information in addition to what is represented in the received NLU hypothesis to provide output data responsive to the user input. In these situations, the skill 690 may provide the post-NLU ranker 665 with result data 1030 indicating slots of a framework that the skill 690 further needs filled or entities that the skill 690 further needs resolved prior to the skill 690 being able to provided result data 1030 responsive to the user input. The skill 690 may also provide the post-NLU ranker 665 with an instruction and/or computer-generated speech indicating how the skill 690 recommends the system solicit further information needed by the skill 690. The skill 690 may further provide the post-NLU ranker 665 with an indication of whether the skill 690 will have all needed information after the user provides additional information a single time, or whether the skill 690 will need the user to provide various kinds of additional information prior to the skill 690 having all needed information. According to the above example, skills 690 may provide the post-NLU ranker 665 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 1030 includes an indication provided by a skill 690 indicating whether or not the skill 690 can execute with respect to a NLU hypothesis; data generated by a skill 690 based on a NLU hypothesis; as well as an indication provided by a skill 690 indicating the skill 690 needs further information in addition to what is represented in the received NLU hypothesis.

The post-NLU ranker 665 uses the result data 1030 provided by the skills 690 to alter the NLU processing confidence scores generated by the reranker 1090. That is, the post-NLU ranker 665 uses the result data 1030 provided by the queried skills 690 to create larger differences between the NLU processing confidence scores generated by the reranker 1090. Without the post-NLU ranker 665, the system may not be confident enough to determine an output in response to a user input, for example when the NLU hypotheses associated with multiple skills are too close for the system to confidently determine a single skill 690 to invoke to respond to the user input. For example, if the system does not implement the post-NLU ranker 665, the system may not be able to determine whether to obtain output data from a general reference information skill or a medical information skill in response to a user input corresponding to "what is acne."

The post-NLU ranker 665 may prefer skills 690 that provide result data 1030 responsive to NLU hypotheses over skills 690 that provide result data 1030 corresponding to an indication that further information is needed, as well as skills 690 that provide result data 1030 indicating they can provide multiple responses to received NLU hypotheses. For example, the post-NLU ranker 665 may generate a first score for a first skill 690*a* that is greater than the first skill's NLU confidence score based on the first skill 690*a* providing result data 1030*a* including a response to a NLU hypothesis. For further example, the post-NLU ranker 665 may generate a second score for a second skill 690*b* that is less than the second skill's NLU confidence score based on the second skill 690*b* providing result data 1030*b* indicating further information is needed for the second skill 690*b* to provide a response to a NLU hypothesis. Yet further, for example, the post-NLU ranker 665 may generate a third score for a third skill 690*c* that is less than the third skill's NLU confidence score based on the third skill 690*c* providing result data 1030*c* indicating the third skill 690*c* can provide multiple responses to a NLU hypothesis.

The post-NLU ranker 665 may consider other data 1020 in determining scores. The other data 1020 may include rankings associated with the queried skills 690. A ranking may be a system ranking or a user-specific ranking. A ranking may indicate a veracity of a skill from the perspective of one or more users of the system. For example, the post-NLU ranker 665 may generate a first score for a first skill 690*a* that is greater than the first skill's NLU processing confidence score based on the first skill 690*a* being associated with a high ranking. For further example, the post-NLU ranker 665 may generate a second score for a second skill 690*b* that is less than the second skill's NLU processing confidence score based on the second skill 690*b* being associated with a low ranking.

The other data 1020 may include information indicating whether or not the user that originated the user input has enabled one or more of the queried skills 690. For example, the post-NLU ranker 665 may generate a first score for a first skill 690*a* that is greater than the first skill's NLU processing confidence score based on the first skill 690*a* being enabled by the user that originated the user input. For further example, the post-NLU ranker 665 may generate a second score for a second skill 690*b* that is less than the second skill's NLU processing confidence score based on the second skill 690*b* not being enabled by the user that originated the user input. When the post-NLU ranker 665 receives the NLU results data 1085, the post-NLU ranker 665 may determine whether profile data, associated with the user and/or device that originated the user input, includes indications of enabled skills.

The other data 1020 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 665 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 665 may increase the NLU processing confidence score associated with a first skill configured to output visual data and/or decrease the NLU processing confidence score associated with a second skill configured to output audio data.

The other data 1020 may include information indicating the veracity of the result data 1030 provided by a skill 690. For example, if a user says "tell me a recipe for pasta sauce," a first skill 690*a* may provide the post-NLU ranker 665 with first result data 1030*a* corresponding to a first recipe associated with a five star rating and a second skill 690*b* may provide the post-NLU ranker 665 with second result data 1030*b* corresponding to a second recipe associated with a one star rating. In this situation, the post-NLU ranker 665 may increase the NLU processing confidence score associated with the first skill 690*a* based on the first skill 690*a* providing the first result data 1030*a* associated with the five star rating and/or decrease the NLU processing confidence score associated with the second skill 690b based on the second skill 690b providing the second result data 1030b associated with the one star rating.

The other data 1020 may include information indicating the type of device that originated the user input. For example, the device may correspond to a "hotel room" type if the device is located in a hotel room. If a user inputs a command corresponding to "order me food" to the device located in the hotel room, the post-NLU ranker 665 may increase the NLU processing confidence score associated with a first skill 690a corresponding to a room service skill associated with the hotel and/or decrease the NLU processing confidence score associated with a second skill 690b corresponding to a food skill not associated with the hotel.

The other data 1020 may include information indicating a location of the device and/or user that originated the user input. The system may be configured with skills 690 that may only operate with respect to certain geographic locations. For example, a user may provide a user input corresponding to "when is the next train to Portland." A first skill 690a may operate with respect to trains that arrive at, depart from, and pass through Portland, Oregon A second skill 690b may operate with respect to trains that arrive at, depart from, and pass through Portland, Maine. If the device and/or user that originated the user input is located in Seattle, Washington, the post-NLU ranker 665 may increase the NLU processing confidence score associated with the first skill 690a and/or decrease the NLU processing confidence score associated with the second skill 690b. Likewise, if the device and/or user that originated the user input is located in Boston, Massachusetts, the post-NLU ranker 665 may increase the NLU processing confidence score associated with the second skill 690b and/or decrease the NLU processing confidence score associated with the first skill 690a.

The other data 1020 may include information indicating a time of day. The system may be configured with skills 690 that operate with respect to certain times of day. For example, a user may provide a user input corresponding to "order me food." A first skill 690a may generate first result data 1030a corresponding to breakfast. A second skill 690b may generate second result data 1030b corresponding to dinner. If the system(s) 120 receives the user input in the morning, the post-NLU ranker 665 may increase the NLU processing confidence score associated with the first skill 690a and/or decrease the NLU processing score associated with the second skill 690b. If the system(s) 120 receives the user input in the afternoon or evening, the post-NLU ranker 665 may increase the NLU processing confidence score associated with the second skill 690b and/or decrease the NLU processing confidence score associated with the first skill 690a.

The other data 1020 may include information indicating user preferences. The system may include multiple skills 690 configured to execute in substantially the same manner. For example, a first skill 690a and a second skill 690b may both be configured to order food from respective restaurants. The system may store a user preference (e.g., in the profile storage 670) that is associated with the user that provided the user input to the system(s) 120 as well as indicates the user prefers the first skill 690a over the second skill 690b. Thus, when the user provides a user input that may be executed by both the first skill 690a and the second skill 690b, the post-NLU ranker 665 may increase the NLU processing confidence score associated with the first skill 690a and/or decrease the NLU processing confidence score associated with the second skill 690b.

The other data 1020 may include information indicating system usage history associated with the user that originated the user input. For example, the system usage history may indicate the user originates user inputs that invoke a first skill 690a more often than the user originates user inputs that invoke a second skill 690b. Based on this, if the present user input may be executed by both the first skill 690a and the second skill 690b, the post-NLU ranker 665 may increase the NLU processing confidence score associated with the first skill 690a and/or decrease the NLU processing confidence score associated with the second skill 690b.

The other data 1020 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 665 may increase the NLU processing confidence score associated with a first skill 690a that generates audio data. The post-NLU ranker 665 may also or alternatively decrease the NLU processing confidence score associated with a second skill 690b that generates image data or video data.

The other data 1020 may include information indicating how long it took a skill 690 to provide result data 1030 to the post-NLU ranker 665. When the post-NLU ranker 665 multiple skills 690 for result data 1030, the skills 690 may respond to the queries at different speeds. The post-NLU ranker 665 may implement a latency budget. For example, if the post-NLU ranker 665 determines a skill 690 responds to the post-NLU ranker 665 within a threshold amount of time from receiving a query from the post-NLU ranker 665, the post-NLU ranker 665 may increase the NLU processing confidence score associated with the skill 690. Conversely, if the post-NLU ranker 665 determines a skill 690 does not respond to the post-NLU ranker 665 within a threshold amount of time from receiving a query from the post-NLU ranker 665, the post-NLU ranker 665 may decrease the NLU processing confidence score associated with the skill 690.

It has been described that the post-NLU ranker 665 uses the other data 1020 to increase and decrease NLU processing confidence scores associated with various skills 690 that the post-NLU ranker 665 has already requested result data from. Alternatively, the post-NLU ranker 665 may use the other data 1020 to determine which skills 690 to request result data from. For example, the post-NLU ranker 665 may use the other data 1020 to increase and/or decrease NLU processing confidence scores associated with skills 690 associated with the NLU results data 1085 output by the NLU component 660. The post-NLU ranker 665 may select n-number of top scoring altered NLU processing confidence scores. The post-NLU ranker 665 may then request result data 1030 from only the skills 690 associated with the selected n-number of NLU processing confidence scores.

As described, the post-NLU ranker 665 may request result data 1030 from all skills 690 associated with the NLU results data 1085 output by the NLU component 660. Alternatively, the system(s) 120 may prefer result data 1030 from skills implemented entirely by the system(s) 120 rather than skills at least partially implemented by the skill system(s) 625. Therefore, in the first instance, the post-NLU ranker 665 may request result data 1030 from only skills associated with the NLU results data 1085 and entirely implemented by the system(s) 120. The post-NLU ranker 665 may only request result data 1030 from skills associated with the NLU results data 1085, and at least partially implemented by the skill system(s) 625, if none of the skills, wholly implemented by the system(s) 120, provide the post-NLU ranker 665 with result data 1030 indicating either data response to the NLU results data 1085, an indication that the skill can execute the user input, or an indication that further information is needed.

As indicated above, the post-NLU ranker 665 may request result data 1030 from multiple skills 690. If one of the skills 690 provides result data 1030 indicating a response to a NLU hypothesis and the other skills provide result data 1030 indicating either they cannot execute or they need further information, the post-NLU ranker 665 may select the result data 1030 including the response to the NLU hypothesis as the data to be output to the user. If more than one of the skills 690 provides result data 1030 indicating responses to NLU hypotheses, the post-NLU ranker 665 may consider the other data 1020 to generate altered NLU processing confidence scores, and select the result data 1030 of the skill associated with the greatest score as the data to be output to the user.

A system that does not implement the post-NLU ranker 665 may select the highest scored NLU hypothesis in the NLU results data 1085. The system may send the NLU hypothesis to a skill 690 associated therewith along with a request for output data. In some situations, the skill 690 may not be able to provide the system with output data. This results in the system indicating to the user that the user input could not be processed even though another skill associated with lower ranked NLU hypothesis could have provided output data responsive to the user input.

The post-NLU ranker 665 reduces instances of the aforementioned situation. As described, the post-NLU ranker 665 queries multiple skills associated with the NLU results data 1085 to provide result data 1030 to the post-NLU ranker 665 prior to the post-NLU ranker 665 ultimately determining the skill 690 to be invoked to respond to the user input. Some of the skills 690 may provide result data 1030 indicating responses to NLU hypotheses while other skills 690 may providing result data 1030 indicating the skills cannot provide responsive data. Whereas a system not implementing the post-NLU ranker 665 may select one of the skills 690 that could not provide a response, the post-NLU ranker 665 only selects a skill 690 that provides the post-NLU ranker 665 with result data corresponding to a response, indicating further information is needed, or indicating multiple responses can be generated.

The post-NLU ranker 665 may select result data 1030, associated with the skill 690 associated with the highest score, for output to the user. Alternatively, the post-NLU ranker 665 may output ranked output data 1025 indicating skills 690 and their respective post-NLU ranker rankings. Since the post-NLU ranker 665 receives result data 1030, potentially corresponding to a response to the user input, from the skills 690 prior to post-NLU ranker 665 selecting one of the skills or outputting the ranked output data 1025, little to no latency occurs from the time skills provide result data 1030 and the time the system outputs responds to the user.

If the post-NLU ranker 665 selects result audio data to be output to a user and the system determines content should be output audibly, the post-NLU ranker 665 (or another component of the system(s) 120) may cause the device 110*a* and/or the device 110*b* to output audio corresponding to the result audio data. If the post-NLU ranker 665 selects result text data to output to a user and the system determines content should be output visually, the post-NLU ranker 665 (or another component of the system(s) 120) may cause the device 110*b* to display text corresponding to the result text data. If the post-NLU ranker 665 selects result audio data to output to a user and the system determines content should be output visually, the post-NLU ranker 665 (or another component of the system(s) 120) may send the result audio data to the ASR component 650. The ASR component 650 may generate output text data corresponding to the result audio data. The system(s) 120 may then cause the device 110*b* to display text corresponding to the output text data. If the post-NLU ranker 665 selects result text data to output to a user and the system determines content should be output audibly, the post-NLU ranker 665 (or another component of the system(s) 120) may send the result text data to the TTS component 180. The TTS component 180 may generate output audio data (corresponding to computer-generated speech) based on the result text data. The system(s) 120 may then cause the device 110*a* and/or the device 110*b* to output audio corresponding to the output audio data.

As described, a skill 690 may provide result data 1030 either indicating a response to the user input, indicating more information is needed for the skill 690 to provide a response to the user input, or indicating the skill 690 cannot provide a response to the user input. If the skill 690 associated with the highest post-NLU ranker score provides the post-NLU ranker 665 with result data 1030 indicating a response to the user input, the post-NLU ranker 665 (or another component of the system(s) 120, such as the orchestrator component 630) may simply cause content corresponding to the result data 1030 to be output to the user. For example, the post-NLU ranker 665 may send the result data 1030 to the orchestrator component 630. The orchestrator component 630 may cause the result data 1030 to be sent to the device (110*a*/110*b*), which may output audio and/or display text corresponding to the result data 1030. The orchestrator component 630 may send the result data 1030 to the ASR component 650 to generate output text data and/or may send the result data 1030 to the TTS component 180 to generate output audio data, depending on the situation.

The skill 690 associated with the highest post-NLU ranker score may provide the post-NLU ranker 665 with result data 1030 indicating more information is needed as well as instruction data. The instruction data may indicate how the skill 690 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110*a*/110*b*). When this occurs, the post-NLU ranker 665 may simply cause the received instruction data be output by the device (110*a*/110*b*). Alternatively, the instruction data may be in a format that is not capable of being output by the device (110*a*/110*b*). When this occurs, the post-NLU ranker 665 may cause the ASR component 650 or the TTS component 180 to process the instruction data, depending on the situation, to generate instruction data that may be output by the device (110*a*/110*b*). Once the user provides the system with all further information needed by the skill 690, the skill 690 may provide the system with result data 1030 indicating a response to the user input, which may be output by the system as detailed above.

The system may include "informational" skills 690 that simply provide the system with information, which the system outputs to the user. The system may also include "transactional" skills 690 that require a system instruction to execute the user input. Transactional skills 690 include ride sharing skills, flight booking skills, etc. A transactional skill 690 may simply provide the post-NLU ranker 665 with result data 1030 indicating the transactional skill 690 can execute the user input. The post-NLU ranker 665 may then cause the system to solicit the user for an indication that the system is permitted to cause the transactional skill 690 to execute the user input. The user-provided indication may be an audible indication or a tactile indication (e.g., activation of a virtual button or input of text via a virtual keyboard). In response to receiving the user-provided indication, the system may provide the transactional skill 690 with data corresponding to the indication. In response, the transactional skill 690 may execute the command (e.g., book a flight, book a train ticket, etc.). Thus, while the system may not further engage an informational skill 690 after the informational skill 690 provides the post-NLU ranker 665 with result data 1030, the system may further engage a transactional skill 690 after the transactional skill 690 provides the post-NLU ranker 665 with result data 1030 indicating the transactional skill 690 may execute the user input.

In some instances, the post-NLU ranker 665 may generate respective scores for first and second skills that are too close (e.g., are not different by at least a threshold difference) for the post-NLU ranker 665 to make a confident determination regarding which skill should execute the user input. When this occurs, the system may request the user indicate which skill the user prefers to execute the user input. The system may output TTS-generated speech to the user to solicit which skill the user wants to execute the user input.

One or more models implemented by components of the orchestrator component 630, post-NLU ranker 665, shortlister 950, or other component may be trained and operated according to various machine learning techniques.

The device 110 and/or the system(s) 120 may include a user recognition component 695 that recognizes one or more users using a variety of data. As illustrated in FIG. 11, the user recognition component 695 may include one or more subcomponents including a vision component 1108, an audio component 1110, a biometric component 1112, a radio frequency (RF) component 1114, a machine learning (ML) component 1116, and a recognition confidence component 1118. In some instances, the user recognition component 695 may monitor data and determinations from one or more subcomponents to determine an identity of one or more users associated with data input to the device 110 and/or the system(s) 120. The user recognition component 695 may output user recognition data 1195, which may include a user identifier associated with a user the user recognition component 695 determines originated data input to the device 110 and/or the system(s) 120. The user recognition data 1195 may be used to inform processes performed by various components of the device 110 and/or the system(s) 120.

The vision component 1108 may receive data from one or more sensors capable of providing images (e.g., cameras) or sensors indicating motion (e.g., motion sensors). The vision component 1108 can perform facial recognition or image analysis to determine an identity of a user and to associate that identity with a user profile associated with the user. In some instances, when a user is facing a camera, the vision component 1108 may perform facial recognition and identify the user with a high degree of confidence. In other instances, the vision component 1108 may have a low degree of confidence of an identity of a user, and the user recognition component 695 may utilize determinations from additional components to determine an identity of a user. The vision component 1108 can be used in conjunction with other components to determine an identity of a user. For example, the user recognition component 695 may use data from the vision component 1108 with data from the audio component 1110 to identify what user's face appears to be speaking at the same time audio is captured by a device 110 the user is facing for purposes of identifying a user who spoke an input to the device 110 and/or the system(s) 120.

The overall system of the present disclosure may include biometric sensors that transmit data to the biometric component 1112. For example, the biometric component 1112 may receive data corresponding to fingerprints, iris or retina scans, thermal scans, weights of users, a size of a user, pressure (e.g., within floor sensors), etc., and may determine a biometric profile corresponding to a user. The biometric component 1112 may distinguish between a user and sound from a television, for example. Thus, the biometric component 1112 may incorporate biometric information into a confidence level for determining an identity of a user. Biometric information output by the biometric component 1112 can be associated with specific user profile data such that the biometric information uniquely identifies a user profile of a user.

The radio frequency (RF) component 1114 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 1114 the strength of the signal (e.g., as a received signal strength indication (RSSI)). The RF component 1114 may use the RSSI to determine an identity of a user (with an associated confidence level). In some instances, the RF component 1114 may determine that a received RF signal is associated with a mobile device that is associated with a particular user identifier.

In some instances, a personal device (such as a phone, tablet, wearable or other device) may include some RF or other detection processing capabilities so that a user who speaks an input may scan, tap, or otherwise acknowledge his/her personal device to the device 110. In this manner, the user may "register" with the system 600 for purposes of the system 600 determining who spoke a particular input. Such a registration may occur prior to, during, or after speaking of an input.

The ML component 1116 may track the behavior of various users as a factor in determining a confidence level of the identity of the user. By way of example, a user may adhere to a regular schedule such that the user is at a first location during the day (e.g., at work or at school). In this example, the ML component 1116 would factor in past behavior and/or trends in determining the identity of the user that provided input to the device 110 and/or the system(s) 120. Thus, the ML component 1116 may use historical data and/or usage patterns over time to increase or decrease a confidence level of an identity of a user.

In at least some instances, the recognition confidence component 1118 receives determinations from the various components 1108, 1110, 1112, 1114, and 1116, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 1195.

The audio component 1110 may receive data from one or more sensors capable of providing an audio signal (e.g., one or more microphones) to facilitate recognition of a user. The audio component 1110 may perform audio recognition on an audio signal to determine an identity of the user and associated user identifier. In some instances, aspects of device 110 and/or the system(s) 120 may be configured at a computing device (e.g., a local server). Thus, in some instances, the audio component 1110 operating on a computing device may analyze all sound to facilitate recognition of a user. In some instances, the audio component 1110 may perform voice recognition to determine an identity of a user.

The audio component 1110 may also perform user identification based on audio data 631 input into the device 110 and/or the system(s) 120 for speech processing. The audio component 1110 may determine scores indicating whether speech in the audio data 631 originated from particular users. For example, a first score may indicate a likelihood that speech in the audio data 631 originated from a first user associated with a first user identifier, a second score may indicate a likelihood that speech in the audio data 631 originated from a second user associated with a second user identifier, etc. The audio component 1110 may perform user recognition by comparing speech characteristics represented in the audio data 631 to stored speech characteristics of users (e.g., stored voice profiles associated with the device 110 that captured the spoken user input).

Figure 12:
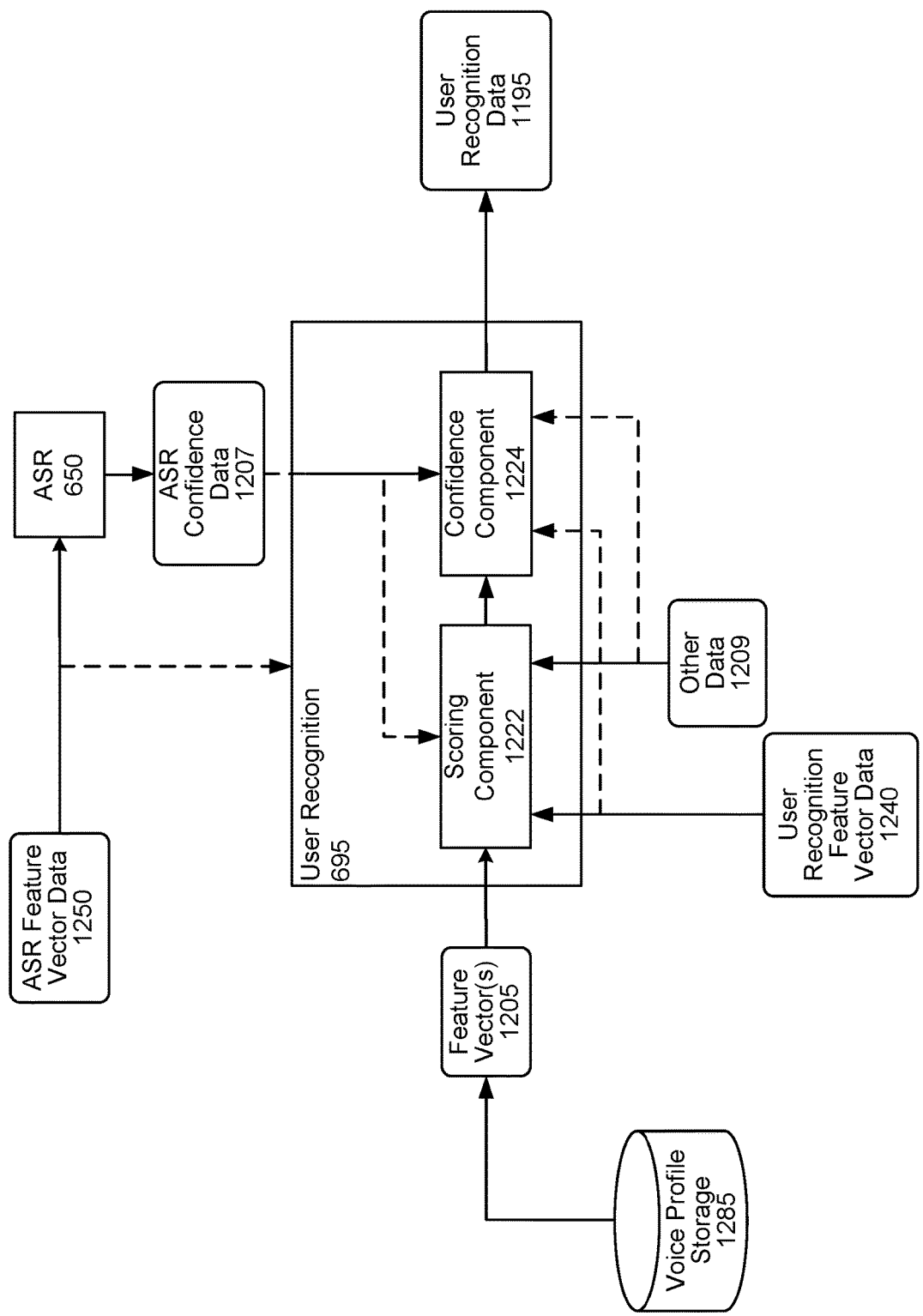
FIG. 12 is a system flow diagram illustrating user recognition according to embodiments of the present disclosure.

FIG. 12 illustrates user recognition processing as may be performed by the user recognition component 695. The ASR component 650 performs ASR processing on ASR feature vector data 1250. ASR confidence data 1207 may be passed to the user recognition component 695.

The user recognition component 695 performs user recognition using various data including the user recognition feature vector data 1240, feature vectors 1205 representing voice profiles of users of the system 600, the ASR confidence data 1207, and other data 1209. The user recognition component 695 may output the user recognition data 1195, which reflects a certain confidence that the user input was spoken by one or more particular users. The user recognition data 1195 may include one or more user identifiers (e.g., corresponding to one or more voice profiles). Each user identifier in the user recognition data 1195 may be associated with a respective confidence value, representing a likelihood that the user input corresponds to the user identifier. A confidence value may be a numeric or binned value.

The feature vector(s) 1205 input to the user recognition component 695 may correspond to one or more voice profiles. The user recognition component 695 may use the feature vector(s) 1205 to compare against the user recognition feature vector 1240, representing the present user input, to determine whether the user recognition feature vector 1240 corresponds to one or more of the feature vectors 1205 of the voice profiles. Each feature vector 1205 may be the same size as the user recognition feature vector 1240.

To perform user recognition, the user recognition component 695 may determine the device 110 from which the audio data 631 originated. For example, the audio data 631 may be associated with metadata including a device identifier representing the device 110. Either the device 110 or the system(s) 120 may generate the metadata. The system 600 may determine a group profile identifier associated with the device identifier, may determine user identifiers associated with the group profile identifier, and may include the group profile identifier and/or the user identifiers in the metadata. The system 600 may associate the metadata with the user recognition feature vector 1240 produced from the audio data 631. The user recognition component 695 may send a signal to voice profile storage 1285, with the signal requesting only audio data and/or feature vectors 1205 (depending on whether audio data and/or corresponding feature vectors are stored) associated with the device identifier, the group profile identifier, and/or the user identifiers represented in the metadata. This limits the universe of possible feature vectors 1205 the user recognition component 695 considers at runtime and thus decreases the amount of time to perform user recognition processing by decreasing the amount of feature vectors 1205 needed to be processed. Alternatively, the user recognition component 695 may access all (or some other subset of) the audio data and/or feature vectors 1205 available to the user recognition component 695. However, accessing all audio data and/or feature vectors 1205 will likely increase the amount of time needed to perform user recognition processing based on the magnitude of audio data and/or feature vectors 1205 to be processed.

If the user recognition component 695 receives audio data from the voice profile storage 1285, the user recognition component 695 may generate one or more feature vectors 1205 corresponding to the received audio data.

The user recognition component 695 may attempt to identify the user that spoke the speech represented in the audio data 631 by comparing the user recognition feature vector 1240 to the feature vector(s) 1205. The user recognition component 695 may include a scoring component 1222 that determines respective scores indicating whether the user input (represented by the user recognition feature vector 1240) was spoken by one or more particular users (represented by the feature vector(s) 1205). The user recognition component 695 may also include a confidence component 1224 that determines an overall accuracy of user recognition processing (such as those of the scoring component 1222) and/or an individual confidence value with respect to each user potentially identified by the scoring component 1222. The output from the scoring component 1222 may include a different confidence value for each received feature vector 1205. For example, the output may include a first confidence value for a first feature vector 1205*a* (representing a first voice profile), a second confidence value for a second feature vector 1205*b* (representing a second voice profile), etc. Although illustrated as two separate components, the scoring component 1222 and the confidence component 1224 may be combined into a single component or may be separated into more than two components.

The scoring component 1222 and the confidence component 1224 may implement one or more trained machine learning models (such as neural networks, classifiers, etc.) as known in the art. For example, the scoring component 1222 may use probabilistic linear discriminant analysis (PLDA) techniques. PLDA scoring determines how likely it is that the user recognition feature vector 1240 corresponds to a particular feature vector 1205. The PLDA scoring may generate a confidence value for each feature vector 1205 considered and may output a list of confidence values associated with respective user identifiers. The scoring component 1222 may also use other techniques, such as GMMs, generative Bayesian models, or the like, to determine confidence values.

The confidence component 1224 may input various data including information about the ASR confidence 1207, speech length (e.g., number of frames or other measured length of the user input), audio condition/quality data (such as signal-to-interference data or other metric data), fingerprint data, image data, or other factors to consider how confident the user recognition component 695 is with regard to the confidence values linking users to the user input. The confidence component 1224 may also consider the confidence values and associated identifiers output by the scoring component 1222. For example, the confidence component 1224 may determine that a lower ASR confidence 1207, or poor audio quality, or other factors, may result in a lower confidence of the user recognition component 695. Whereas a higher ASR confidence 1207, or better audio quality, or other factors, may result in a higher confidence of the user recognition component 695. Precise determination of the confidence may depend on configuration and training of the confidence component 1224 and the model(s) implemented thereby. The confidence component 1224 may operate using a number of different machine learning models/techniques such as GMM, neural networks, etc. For example, the confidence component 1224 may be a classifier configured to map a score output by the scoring component 1222 to a confidence value.

The user recognition component 695 may output user recognition data 1195 specific to a one or more user identifiers. For example, the user recognition component 695 may output user recognition data 1195 with respect to each received feature vector 1205. The user recognition data 1195 may include numeric confidence values (e.g., 0.0-1.0, 0-1000, or whatever scale the system is configured to operate). Thus, the user recognition data 1195 may output an n-best list of potential users with numeric confidence values (e.g., user identifier 123—0.2, user identifier 234—0.8). Alternatively or in addition, the user recognition data 1195 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 695 may output an n-best list of user identifiers with binned confidence values (e.g., user identifier 123—low, user identifier 234—high). Combined binned and numeric confidence value outputs are also possible. Rather than a list of identifiers and their respective confidence values, the user recognition data 1195 may only include information related to the top scoring identifier as determined by the user recognition component 695. The user recognition component 695 may also output an overall confidence value that the individual confidence values are correct, where the overall confidence value indicates how confident the user recognition component 695 is in the output results. The confidence component 1224 may determine the overall confidence value.

The confidence component 1224 may determine differences between individual confidence values when determining the user recognition data 1195. For example, if a difference between a first confidence value and a second confidence value is large, and the first confidence value is above a threshold confidence value, then the user recognition component 695 is able to recognize a first user (associated with the feature vector 1205 associated with the first confidence value) as the user that spoke the user input with a higher confidence than if the difference between the confidence values were smaller.

The user recognition component 695 may perform thresholding to avoid incorrect user recognition data 1195 being output. For example, the user recognition component 695 may compare a confidence value output by the confidence component 1224 to a threshold confidence value. If the confidence value does not satisfy (e.g., does not meet or exceed) the threshold confidence value, the user recognition component 695 may not output user recognition data 1195, or may only include in that data 1195 an indicator that a user that spoke the user input could not be recognized. Further, the user recognition component 695 may not output user recognition data 1195 until enough user recognition feature vector data 1240 is accumulated and processed to verify a user above a threshold confidence value. Thus, the user recognition component 695 may wait until a sufficient threshold quantity of audio data of the user input has been processed before outputting user recognition data 1195. The quantity of received audio data may also be considered by the confidence component 1224.

The user recognition component 695 may be defaulted to output binned (e.g., low, medium, high) user recognition confidence values. However, such may be problematic in certain situations. For example, if the user recognition component 695 computes a single binned confidence value for multiple feature vectors 1205, the system may not be able to determine which particular user originated the user input. In this situation, the user recognition component 695 may override its default setting and output numeric confidence values. This enables the system to determine a user, associated with the highest numeric confidence value, originated the user input.

The user recognition component 695 may use other data 1209 to inform user recognition processing. A trained model(s) or other component of the user recognition component 695 may be trained to take other data 1209 as an input feature when performing user recognition processing. Other data 1209 may include a variety of data types depending on system configuration and may be made available from other sensors, devices, or storage. The other data 1209 may include a time of day at which the audio data 631 was generated by the device 110 or received from the device 110, a day of a week in which the audio data 631 was generated by the device 110 or received from the device 110, etc.

The other data 1209 may include image data or video data. For example, facial recognition may be performed on image data or video data received from the device 110 from which the audio data 631 was received (or another device). Facial recognition may be performed by the user recognition component 695. The output of facial recognition processing may be used by the user recognition component 695. That is, facial recognition output data may be used in conjunction with the comparison of the user recognition feature vector 1240 and one or more feature vectors 1205 to perform more accurate user recognition processing.

The other data 1209 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 1209 may include data indicating a type of the device 110. Different types of devices may include, for example, a smart watch, a smart phone, a tablet, and a vehicle. The type of the device 110 may be indicated in a profile associated with the device 110. For example, if the device 110 from which the audio data 631 was received is a smart watch or vehicle belonging to a user A, the fact that the device 110 belongs to user A may increase a user recognition confidence value associated with user A and/or decrease a user recognition confidence value associated with user B.

The other data 1209 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the vehicle generated the audio data 631. As such, if the vehicle is located at a coordinate corresponding to a work location/building of user A, such may increase a user recognition confidence value associated with user A and/or decrease user recognition confidence values of all other users indicated in a group profile associated with the vehicle. A profile associated with the device 110 may indicate global coordinates and associated locations (e.g., work, home, etc.). One or more user profiles may also or alternatively indicate the global coordinates.

The other data 1209 may include data representing activity of a particular user that may be useful in performing user recognition processing. For example, a user may have recently entered a code to disable a home security alarm. A device 110, represented in a group profile associated with the home, may have generated the audio data 631. The other data 1209 may reflect signals from the home security alarm about the disabling user, time of disabling, etc. If a mobile device (such as a smart phone, Tile, dongle, or other device) known to be associated with a particular user is detected proximate to (for example physically close to, connected to the same Wi-Fi network as, or otherwise nearby) the device 110, this may be reflected in the other data 1209 and considered by the user recognition component 695.

Depending on system configuration, the other data 1209 may be configured to be included in the user recognition feature vector data 1240 so that all the data relating to the user input to be processed by the scoring component 1222 may be included in a single feature vector. Alternatively, the other data 1209 may be reflected in one or more different data structures to be processed by the scoring component 1222.

Figure 13:
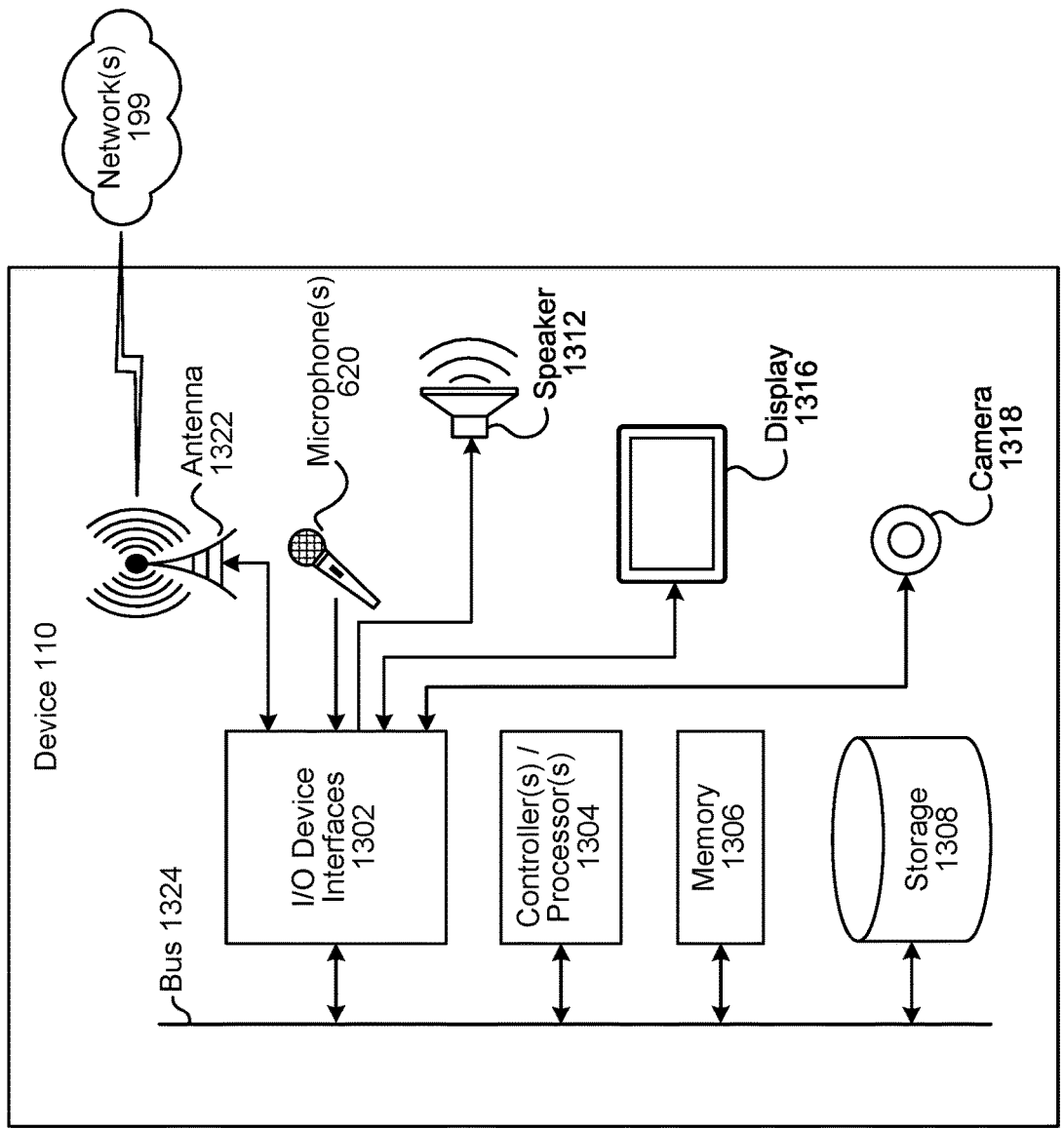
FIG. 13 is a block diagram conceptually illustrating example components of a device, according to embodiments of the present disclosure.

FIG. 13 is a block diagram conceptually illustrating a device 110 that may be used with the system. FIG. 14 is a block diagram conceptually illustrating example components of a remote device, such as the natural language command processing system 120, which may assist with ASR processing, NLU processing, etc., and a skill system 625. A system (120/625) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system 120 may be located remotely from the device 110 as its operations may not require proximity to the user. The server/system 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the server/system 120 being in a user's home/business is that data used to process a command/return a response may be kept within the user's home, thus reducing potential privacy concerns.

Multiple systems (120/625) may be included in the overall system 600 of the present disclosure, such as one or more natural language processing systems 120 for performing ASR processing, one or more natural language processing systems 120 for performing NLU processing, one or more skill systems 625, etc. In operation, each of these systems may include computer-readable and computer-executable instructions that reside on the respective device (120/625), as will be discussed further below.

Each of these devices (110/120/625) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/120/625) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/120/625) may also be connected to removable or external non-volatile memory and/or storage (such as a removable memory card, memory key drive, networked storage, etc.) through respective input/output device interfaces (1302/1402).

Computer instructions for operating each device (110/120/625) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120/625) includes input/output device interfaces (1302/1402). A variety of components may be connected through the input/output device interfaces (1302/1402), as will be discussed further below. Additionally, each device (110/120/625) may include an address/data bus (1324/1424) for conveying data among components of the respective device. Each component within a device (110/120/625) may also be directly connected to other components in addition to (or instead of) being connected to other components across the bus (1324/1424).

Referring to FIG. 13, the device 110 may include input/output device interfaces 1302 that connect to a variety of components such as an audio output component such as a loudspeaker 1312, a wired headset or a wireless headset (not illustrated), or other component capable of outputting audio. The device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1316 for displaying content. The device 110 may further include a camera 1318.

Via antenna(s) 1322, the input/output device interfaces 1302 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1302/1402) may also include communication components that allow data to be exchanged between devices such as different physical servers in a collection of servers or other components.

The components of the device(s) 110, the natural language command processing system 120, or a skill system 625 may include their own dedicated processors, memory, and/or storage. Alternatively, one or more of the components of the device(s) 110, the natural language command processing system 120, or a skill system 625 may utilize the I/O interfaces (1302/1402), processor(s) (1304/1404), memory (1306/1406), and/or storage (1308/1408) of the device(s) 110, natural language command processing system 120, or the skill system 625, respectively. Thus, the ASR component 650 may have its own I/O interface(s), processor(s), memory, and/or storage; the NLU component 660 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 625, as described herein, are illustrative, and may be located as a stand-alone device or may be included, in whole or in part, as a component of a larger device or system. As can be appreciated, a number of components may exist either on a system 120 and/or on device 110; for example, the language processing components 692 (which may include ASR 650), the language output components 693 (which may include NLG 679 and TTS 180), etc., for example as illustrated in FIG. 6. Unless expressly noted otherwise, the system version of such components may operate similarly to the device version of such components and thus the description of one version (e.g., the system version or the local version) applies to the description of the other version (e.g., the local version or system version) and vice-versa.

As illustrated in FIG. 15, multiple devices (110a-110n, 120, 625) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, autonomously motile device 110k (e.g., a robot), etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 120, the skill system(s) 625, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 650, the NLU component 660, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
  processing first recorded speech representing at least a first utterance of a first speaker to determine first target spectrogram data representing at least the first utterance;
  determining first voice characteristic data of the first recorded speech, the first voice characteristic data including first fundamental frequency data and first speaker embedding data corresponding to the first speaker;
  generating, using a text-to-speech (TTS) component and first data representing a first transcript of the first recorded speech, first predicted spectrogram data of first synthesized speech representing the at least first utterance, the first predicted spectrogram data having voice characteristics different from the first recorded speech;
  processing the first predicted spectrogram data and the first voice characteristic data using a first neural network to generate first voice-modified spectrogram data, the first voice-modified spectrogram data having modified voice characteristics relative to the first predicted spectrogram data;
  calculating first loss data based at least in part on a difference between the first target spectrogram data and the first voice-modified spectrogram data; and
  performing first training using the first neural network and the first loss data to determine a second neural network configured to process second predicted spectrogram data to generate second voice-modified spectrogram data having voice characteristics similar to the first voice characteristic data.

2. The method of claim 1, further comprising:
  receiving second data representing a second transcript of speech to be synthesized according to the first voice characteristic data;
  processing the second data using the TTS component to generate third predicted spectrogram data of third synthesized speech;
  processing the third predicted spectrogram data and the first voice characteristic data using the second neural network to generate third voice-modified spectrogram data representing the third synthesized speech, third voice-modified spectrogram data having voice characteristics similar to the first recorded speech;
  processing the third voice-modified spectrogram data using a vocoder to generate audio waveform data; and
  causing a device to output an audible signal corresponding to the audio waveform data.

3. The method of claim 1, further comprising:
  receiving second target spectrogram data and second voice characteristic data, the second target spectrogram data and the second voice characteristic data corresponding to second recorded speech of at least a second speaker and a third speaker, wherein the second speaker and the third speaker are different from the first speaker;
  receiving third predicted spectrogram data of third synthesized speech generated based on second data representing a second transcript corresponding to the second recorded speech;
  processing the third predicted spectrogram data and the second voice characteristic data using a third neural network to generate third voice-modified spectrogram data;
  calculating second loss data between the second target spectrogram data and the third voice-modified spectrogram data; and
  performing second training of the third neural network using the second loss data to determine the first neural network.

4. The method of claim 3, further comprising:
  receiving third recorded speech of a fourth speaker;
  receiving third data representing a third transcript of the third recorded speech;
  processing the third recorded speech to determine third target spectrogram data and third voice characteristic data of the third recorded speech;
  generating, using a fourth neural network and the third data, fourth predicted spectrogram data;
  determining, using the third target spectrogram data and the fourth predicted spectrogram data, a fifth neural network configured to perform TTS processing to generate synthesized speech having speech characteristics similar to the third voice characteristic data, wherein the TTS component includes the fifth neural network; and
  generating, using the TTS component and the second data, the third predicted spectrogram data.

5. A method comprising:
  receiving first audio data representing first speech;
  determining first voice characteristic data from the first audio data;
  generating, using a text-to-speech (TTS) component and first data representing a first transcript of the first speech, second audio data representing first synthesized speech;
  processing the second audio data using a first machine learning model and the first voice characteristic data to generate third audio data representing the first synthesized speech; and
  determining, using the first machine learning model, the first audio data, and the third audio data, a second machine learning model configured to generate second synthesized speech using the first voice characteristic data.

6. The method of claim 5, further comprising:
  receiving second data representing a second transcript of speech to be synthesized according to the first voice characteristic data;

generating, using the TTS component and the second data, fourth audio data representing third synthesized speech; and processing the fourth audio data using the second model and the first voice characteristic data to generate fifth audio data representing the third synthesized speech, the fifth audio data having voice characteristics similar to the first speech.

7. The method of claim 6, wherein the fifth audio data includes spectrogram data, the method further comprising:
processing the spectrogram data using a vocoder to generate audio waveform data; and
causing a device to output an audible signal corresponding to the audio waveform data.

8. The method of claim 6, further comprising:
determining first frequency data of the first speech;
determining second frequency data of the fourth audio data; and
processing the fourth audio data using the first frequency data and the second frequency data such that third frequency data of the fifth audio data approximates the first frequency data.

9. The method of claim 5, wherein the first audio data includes first spectrogram data and the second audio data includes second spectrogram data, the method further comprising:
calculating first loss data based at least in part on a difference between the first spectrogram data and the second spectrogram data; and
performing training using the first machine learning model and the first loss data to determine the second machine learning model.

10. The method of claim 5, further comprising:
receiving fourth audio data and second voice characteristic data, the fourth audio data and the second voice characteristic data corresponding to second speech, wherein the second voice characteristic data is different from the first voice characteristic data;
receiving fifth audio data corresponding to third synthesized speech generated using the TTS component based on second data representing a second transcript corresponding to the second speech;
processing the fifth audio data and the second voice characteristic data using a third machine learning model to generate sixth audio data representing the third synthesized speech; and
determining, using the fourth audio data and the sixth audio data, the first machine learning model.

11. The method of claim 10, further comprising:
receiving fourth audio data representing third speech;
processing, using a fourth machine learning model, third data representing a third transcript of the third speech to generate fifth audio data representing third synthesized speech; and
determining, using the fourth audio data and the fifth audio data, a fifth machine learning model, the fifth machine learning model corresponding to a TTS model trained using the fourth audio data.

12. The method of claim 5, wherein the second machine learning model is a neural network model comprising at least a convolution layer, a long short-term memory network, and a dense layer.

13. A system, comprising:
at least one processor; and
at least one memory comprising instructions that, when executed by the at least one processor, cause the system to:
receive first audio data representing first speech;
determine first voice characteristic data from the first audio data;
generate, using a text-to-speech (TTS) component and first data representing a first transcript of the first speech, second audio data representing first synthesized speech;
process the second audio data using a first model and the first voice characteristic data to generate third audio data representing the first synthesized speech; and
determine, using the first machine learning model, the first audio data, and the third audio data, a second machine learning model configured to generate second synthesized speech using the first voice characteristic data.

14. The system of claim 13, wherein the at least one memory further includes instructions that, when executed by the at least one processor, further cause the system to:
receive second data representing a second transcript of speech to be synthesized according to the first voice characteristic data;
generate, using the TTS component and the second data, fourth audio data representing third synthesized speech; and
process the fourth audio data using the second model and the first voice characteristic data to generate fifth audio data representing the third synthesized speech, the fifth audio data having voice characteristics similar to the first speech.

15. The system of claim 14, wherein the fifth audio data includes spectrogram data, and the at least one memory further includes instructions that, when executed by the at least one processor, further cause the system to:
process the spectrogram data using a vocoder to generate audio waveform data; and
cause a device to output an audible signal corresponding to the audio waveform data.

16. The system of claim 14, wherein the at least one memory further includes instructions that, when executed by the at least one processor, further cause the system to:
determining first frequency data of the first speech;
determining second frequency data of the fourth audio data; and
processing the fourth audio data using the first frequency data and the second frequency data such that third frequency data of the fifth audio data approximates the first frequency data.

17. The system of claim 13, wherein the first audio data includes first spectrogram data, the second audio data includes second spectrogram data, and the at least one memory further includes instructions that, when executed by the at least one processor, further cause the system to:
calculate loss data based at least in part on a difference between the first spectrogram data and the second spectrogram data; and
perform training using the first machine learning model and the first loss data to determine the second machine learning model.

18. The system of claim 13, wherein the at least one memory further includes instructions that, when executed by the at least one processor, further cause the system to:
receive fourth audio data and second voice characteristic data, the fourth audio data and the second voice characteristic data corresponding to second speech, wherein the second voice characteristic data is different from the first voice characteristic data;

receive fifth audio data corresponding to third synthesized speech generated using the TTS component based on second data representing a second transcript corresponding to the second speech;

process the fifth audio data and the second voice characteristic data using a third machine learning model to generate sixth audio data representing the third synthesized speech modified according to the second voice characteristic data; and determine, using the fourth audio data and the sixth audio data, the first machine learning model.

19. The system of claim 18, wherein the at least one memory further includes instructions that, when executed by the at least one processor, further cause the system to:

receive fourth audio data representing third speech;

process, using a fourth machine learning model, third data representing a third transcript of the third speech to generate fifth audio data representing third synthesized speech; and determine, using the fourth audio data and the fifth audio data, a fifth machine learning model, the fifth machine learning model corresponding to a TTS model trained using the fourth audio data.

20. The system of claim 13, wherein the second machine learning model is a neural network model comprising at least a convolution layer, a long short-term memory network, and a dense layer.

* * * * *